(12) United States Patent
Okazaki et al.

(10) Patent No.: US 7,614,954 B2
(45) Date of Patent: Nov. 10, 2009

(54) GAME IMAGE DISPLAY CONTROL PROGRAM, GAME DEVICE, AND RECODING MEDIUM

(75) Inventors: Yuichi Okazaki, Tokyo (JP); Takashi Atsu, Tokyo (JP)

(73) Assignee: Sega Corporation, Tokyo (JP)

( * ) Notice: Subject to any disclaimer, the term of this patent is extended or adjusted under 35 U.S.C. 154(b) by 973 days.

(21) Appl. No.: 10/535,516

(22) PCT Filed: Nov. 20, 2003

(86) PCT No.: PCT/JP03/14835

§ 371 (c)(1), (2), (4) Date: May 18, 2005

(87) PCT Pub. No.: WO2004/045734

PCT Pub. Date: Jun. 3, 2004

(65) Prior Publication Data

US 2006/0040738 A1     Feb. 23, 2006

(30) Foreign Application Priority Data

Nov. 20, 2002   (JP)   ............................. 2002-336371

(51) Int. Cl.
    *A63F 9/24*   (2006.01)
(52) U.S. Cl. ........................................ 463/32
(58) Field of Classification Search ................ None
    See application file for complete search history.

(56) References Cited

U.S. PATENT DOCUMENTS 4,672,541 A  *  6/1987  Bromley et al. ............... 463/3
5,902,030 A  *  5/1999  Blanchard ..................... 353/30
6,409,596 B1 *  6/2002  Hayashida et al. ............ 463/31
6,431,982 B2 *  8/2002  Kobayashi ..................... 463/4

FOREIGN PATENT DOCUMENTS

EP           0 911 069 A       4/1999

(Continued)

OTHER PUBLICATIONS

JPO machine translation of JP2001-353358, 50 pages.*

(Continued)

*Primary Examiner*—M. Sager
(74) *Attorney, Agent, or Firm*—Wenderoth, Lind & Ponack, L.L.P.

(57) ABSTRACT

A game image display control program in which a range that is in a visual field can match a radar visual field display. The program displays a video picture captured from a first visual point position in a virtual three-dimensional space as a main screen of game on a display unit, and displays predetermined range (where the virtual three-dimensional space is captured from a second visual point position and a visual field area, where an area in which the virtual three-dimensional space is captured from the first or a third visual point position at a predetermined azimuthal angle is projected in the predetermined range) as a radar image representing a position relationship of an object on a three-dimensional map including the virtual three-dimensional space on the display unit. The program also changes a shape of the visual field area according to a shape of the main screen in the display unit.

16 Claims, 17 Drawing Sheets

FOREIGN PATENT DOCUMENTS

| | | |
|---|---|---|
| EP | 1 217 600 A1 | 6/2002 |
| JP | 6-91054 | 4/1994 |
| JP | 11-146979 | 6/1999 |
| JP | 2000-116946 | 4/2000 |
| JP | 2001-353358 | 12/2001 |

OTHER PUBLICATIONS

JPO machine translation of JP 6-091054, 17 pages.*
"Mobile Suit Gundam F91 Formula War 0122 Offical Guide Book" Bandai Co., Ltd., Jul. 31, 1991, pp. 10-13 and 78-79. (With English language abstract.).

* cited by examiner

GAME IMAGE DISPLAY CONTROL PROGRAM, GAME DEVICE, AND RECODING MEDIUM

TECHNICAL FIELD

The present invention relates to a game image display control program which has a function for displaying an image, which represents an arrangement relationship of specified objects on a map composing a virtual three-dimensional space, as a radar image, and also relates to a game machine, and a storage medium. The invention particularly relates to the game image display control program which changes a shape of a visual field area according to a shape of a game screen so as to display the radar image on arbitrary display devices with various screen ratio (aspect ratio), the game machine and the storage medium.

BACKGROUND ART

In game machines which realize computer games such as so-called action type games and role playing games, a leading character (player character) in a game image displayed on a screen of a display device is controlled according to an operation signal from an input device (controller pad) operated by a player, so that the story of the game proceeds. Particularly in recent years, according to improvement of hardware performance, a game image such that a player character acts in the virtual three-dimensional space is provided in a form of three-dimensional graphics, thereby heightening the presentation effect of the game.

In three-dimensional graphics, a spatial position relationship of an object in a visual line direction is obtained from a visual point position in the virtual three-dimensional space based on three-dimensional data expressing the object, an image process such as a rendering process is executed, so that the object is expressed three-dimensionally. That is to say, in games utilizing three-dimensional graphics, a player character and another object captured from the visual point position are expressed three-dimensionally, and the visual point position and the visual line are moved according to operations by the player or game scenes. Game images in which the virtual three-dimensional space is expressed in such a manner are provided.

Game machines, which provide game images where the virtual three-dimensional space is expressed from a specified camera angle in games such as action type games using a lot of three-dimensional graphics, provide the following game images, for example. In the game images, a character which moves in response to an operation by the planer is tracked to be photographed by a virtual camera arranged in an upper-backward position of the character. In the case where the thing which is present besides far background such as mist is expressed, an effect image which draws the landscape is synthesized with the far background and the character image to be displayed, so that various things which come into the visual field of the virtual camera are expressed, thereby providing the sense of reality.

In the case where an object which moves in the virtual three-dimensional space is to be displayed, like an image which is tracked to be photographed by the virtual camera is displayed on a display unit of the display device. Since a size of a display area is, however, limited, only a range of the viewing angle where the virtual camera is the visual point is displayed. For this reason, a screen, on which the arrangement relationship of a specified object such as its current position and a relative position relationship between the specified object and another mobile object in a course map where a moving range is limited is shown as a pattern in a reduced-size graphic (hereinafter, radar image), as well as a main screen is displayed in order to understand a condition of a range which is not displayed in a range captured by the virtual camera (for example, see Patent Document 1).

Further, the game machines which display radar images include the following game machines (for example, see Non-Patent Document 1). In this game machine, like a game where a player's battleplane is operated to attack an opponent's battleplane, a circular radar frame obtained by patterning a radar, for example, as well as a visual field image captured from the self battleplane is displayed on a display unit, a "visual field display" representing a portion actually displayed on a main screen is displayed as a radar image in a radar detection space, and a player's sight is set on the opponent's battleplane in the radar image so as to attack the opponent's battleplane. At this time, on the radar image which represents the radar detection space, a character to be operated by the player is arranged on the center or lower-end center, and a position of the object is displayed as a small window represented by a light spot or a symbol with the character looking down the ground vertically. A fan shaped (or (inverted) triangular) section whose center (apex) shows the character to by operated by the player is displayed within the small window, so that a visual field portion is expressed.

In recent years, the display devices include two types of display devices whose screen ratio (aspect ratio) is 4:3, namely, have a normal screen (standard screen) and 16:9, namely, have a wide screen. In image processing devices such as game machines which display virtual objects, however, even if the aspect ratio is different from the above aspect ratios, a player feels less discomfort at the screen unlike television broadcasting which provides an actual live image. For this reason, images are generally processed without taking the screen ratio into consideration. When, however, images on the standard screen created by the image processing devices such as the game machines are directly displayed on the wide screen, defects such as non-image portions on right and left portions occur.

When the images on the standard screen are displayed on a wide-screen television or monitor device which has a function for converting the aspect ratio in a lateral direction and a vertical direction of a sampling signal, the lateral direction is widened or the vertical direction is reduced. For this reason, the images are extended laterally or the images are reduced vertically, and thus distorted images are displayed. In such display devices having the function for switching between the standard images and the wide images, image data, which are reduced or enlarged by the opposite scaling to the scaling in the display devices, are created to be output to the display devices, so that the images can be displayed with the original ratio. When, however, such images are displayed on the display devices having a wide-size screen which does not have the switching function, a defect such as an image distorted to an opposite direction occurs.

The image processing devices which display the virtual objects such as game machines do not generally cope with various screen ratios, and even if they cope with the various ratios, defects occur in the display devices which do not have the function for switching between the wide-size screen and the standard screen in the image processing system which reduce or enlarge images with the scaling opposite to the scaling in the display devices. Particularly in the radar images where a predetermined area in the three-dimensional virtual space is expressed by reduced figure or the like, images in which the wide-screen display devices are taken into consideration are not processed, and even when the ratio of the image on the main screen is switched, the size of the visual field display of the radar portion is not changed. Further, in the form where the ratio is switched in the display device, a range which is actually in the visual field is different from the visual field display of the radar, a shape of the radar frame on the radar display portion is distorted, and the arrangement relationship of the object in the three-dimensional space to be displayed on the radar is not accurate. Conventionally, the radar image is displayed as a fan-shaped or inverted triangular plane representing the detection space, and display contents are fixed ones which are looked down vertically. A range which is actually in the visual field does not match with the visual field display of the radar, and the radar images which are obtained by capturing the visual field area in an arbitrary direction from the visual point position in the virtual three-dimensional space in conjunction with the game images cannot be displayed on the wide-size screen without trouble.

The present invention is devised from the viewpoint of the above situation, and its object is to provide a game image display control program which is capable of allowing a range which is actually in a visual field to match with a visual field display of a radar even when a radar image is displayed on a display device with varied screen ratio, a game machine, and a storage medium.

DISCLOSURE OF INVENTION

The present invention relates to a game image display control program, a game machine, and a storage medium, and its object is achieved by a game image display control program for allowing a computer to realize a function for displaying a video picture captured from a first visual point position in a virtual three-dimensional space as a main screen of a game on a display unit, and displaying a predetermined range where the virtual three-dimensional space is captured from a second visual point position and a visual field area, in which an area where the virtual three-dimensional space is captured from the first or a third visual point position at a predetermined azimuthal angle is projected in the predetermined range, as a radar image representing a position relationship of an object on a three-dimensional map composing the virtual three-dimensional space, comprising a function for changing a shape of the visual field area according to a shape of the main screen in the display unit.

Further, the object of the present invention is achieved more effectively by a function for changing the shape of the main screen according to a screen ratio of the display unit to change the shape of the visual field area accordingly; a function for changing the shape of the visual field area according to a screen ratio of the display unit independently from a change in the shape of the main screen; a function for capable of setting the shape of the main screen independently from a screen ratio of the display unit and changing the shape of the visual field area according to the set shape of the main screen; a function for changing the shape of the main screen according to game proceeding; that the visual field area is a pyramid shaped or a conical visual field area where the first or the third visual point position is an apex; that the visual field area is a quadrangular pyramid shaped or a conical visual field area where the first or the third visual point position is an apex, and a function for changing the shape of the main screen and the shape of the visual field area so that an aspect ratio of a bottom surface of the quadrangular pyramid matches with the screen ratio of the display unit; and a function having a virtual camera which photographs an area captured from the first or the third visual point position for adjusting a field angle of the virtual camera according to the shape of the main screen so as to change the shape of the visual field area.

Further, the present invention is achieved more effectively by a function having at least a mode where a ratio of a horizontal direction to a vertical direction of the screen of the display unit is 4:3 and a mode where the ratio is 16:9 for widening a visual field in the horizontal direction of the visual field area in the mode of 16:9 in comparison with the mode of 4:3; that the video picture to be displayed on the main screen is a video picture relating to the mobile object moving in the virtual three-dimensional space in response to a player's operation and a visual field direction of the video picture on the main screen can be freely rotationally moved to any directions in the virtual three-dimensional space with the first visual point position being a center independently from an advancing direction of the mobile object and a function for controlling a rotation movement of the visual field area in conjunction with the rotational movement of the video picture on the main screen; that the video picture to be displayed on the main screen is a video picture relating to the mobile object moving in the virtual three-dimensional space in response to the player's operation, and an entire movable area of the mobile object or a periphery of the mobile object is displayed as the radar image; that the video picture to be displayed on the main screen is a video picture relating to the mobile object moving in the virtual three-dimensional space in response to the player's operation, and the third visual point position is a position of the mobile object or a position in its vicinity; that the video picture to be displayed on the main screen is a video picture relating to the mobile object moving in the virtual three-dimensional space in response to the player's operation, and the second visual point position is a position above the mobile object; and that the video picture to be displayed on the main screen is a video picture relating to the mobile object moving in the virtual three-dimensional space in response to the player's operation, and a predetermined range where the virtual three-dimensional space is captured from the second visual point position is a range centering on the mobile object.

In another way, the present invention is achieved by a game image display control program for allowing a computer to realize a function for displaying a video picture obtained by capturing a mobile object moving in a virtual three-dimensional space from a first visual point position as a main screen of a game on a display unit, a function for capturing a predetermined range centering on the mobile object in the virtual three-dimensional space and a predetermined object included in the predetermined range from a position above the mobile object and displaying the predetermined range and icons representing the mobile object and the object as a radar image on a part of the main screen of the game, and a function for displaying a visual field area, where an area in which the virtual three-dimensional space is captured from the first visual point position or from the position of the mobile object is projected in the predetermined range, on a radar screen, comprising: a function for changing a shape of the main screen according to a shape of the display unit or game proceeding; and a function for changing a shape of the visual field area according to the shape of the main screen.

Further, the present invention is achieved by a game machine which is constituted so as to be capable of executing any one of the above game image control programs. Further, the invention is achieved by a recording medium which is a readable by means of a computer and into which any one of the above game image control programs is recorded.

DETAILED DESCRIPTION OF THE INVENTION

Embodiments of the present invention are explained in detailed below with reference to the drawings. A game proceeds while a predetermined mobile object (hereinafter, player character), which moves in a virtual three-dimensional space in response to an operation input by an operator (hereinafter, player), is moving along a predetermined course in the virtual three-dimensional space where a moving area is limited like a car racecourse having a course frame or is freely moving in the virtual three-dimensional space where a moving area is not limited like cosmic space. A case where the present invention is applied to such computer games is explained as an example.

Figure 1:
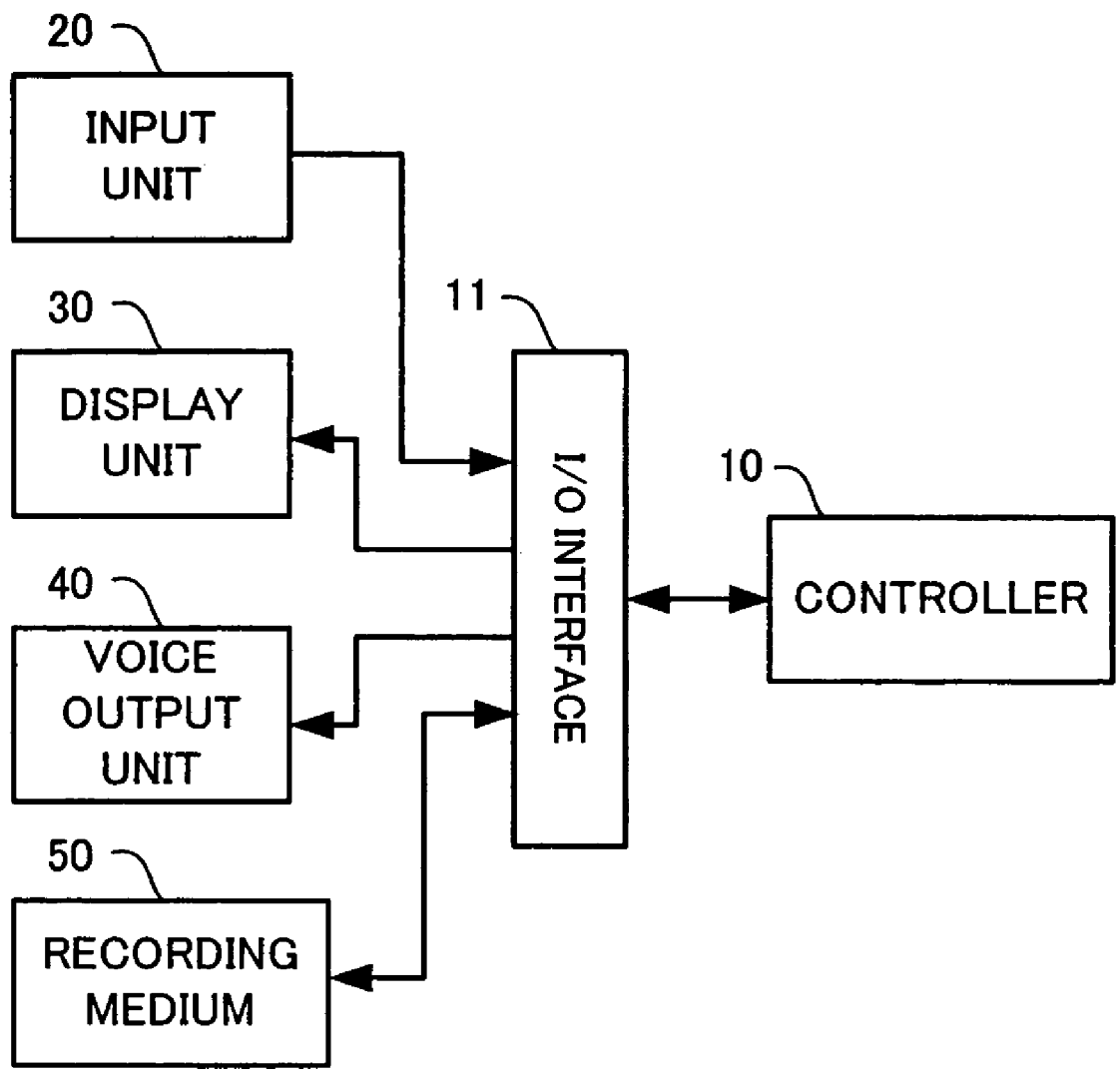
FIG. 1 is a block diagram illustrating one example of a constitution of an information processing device which realizes the present invention.

A device which realizes an image processing method relating to a radar image in the virtual three-dimensional space according to the present invention may be an information processing device, which can execute and control a computer program, such as a home-use game machine, a personal computer, a mobile phone, an arcade game machine, and a simulation device. A multi-purpose constitution can be applied to its hardware constitution. FIG. 1 is a block diagram illustrating one example of a constitution of an information processing device which realizes the present invention (hereinafter, game machine). The game machine according to the present invention has a controller 10 that controls execution of a computer program and controls input/output with respect to peripheral equipment via an I/O interface 11, an input unit 20 that inputs operation information or the like of a player, a display unit 30 that displays an image thereon, a voice output unit 40 that outputs sound effects, voice and the like, and a recording medium 50 that records an application program, data and the like therein. As hardware, the controller 10 is composed of a control device such as CPU or MPU, the operation information input unit 20 is composed of an input device such as a control pad, joy stick or a keyboard, the display unit 30 is composed of a display device such as a liquid crystal display or CRT, and the voice output unit 40 is composed of a sound output device such as a speaker. In the present invention, types and a number of hardware are not limited to the above types and numbers.

The recording medium 50 is an information storage medium that stores an image processing program and data of the present invention therein, a type and a location of the medium are not limited as long as CPU can control input/output into/from the recording medium 50. For example, a program which is recorded in a recording medium of a server on a network may be made to be cooperative with a program of the game machine so that a process relating to computer graphics is executed. A program may be read from a predetermined recording medium of the game machine (flexible disc, hard disc, CD-ROM, CD-R, DVD-ROM, DVD-RAM, DVD-R, PD disc, MD disc, MO disc, memory card or IC card), so that the process is independently executed by the game machine. The latter form is explained as an example.

The image processing function of the present invention is realized by a computer program (hereinafter, program) executed by CPU, and this program is recorded in the predetermined recording medium 50 on the game machine. The present invention includes the form that a part of the image processing function is realized by hardware.

Figure 2:
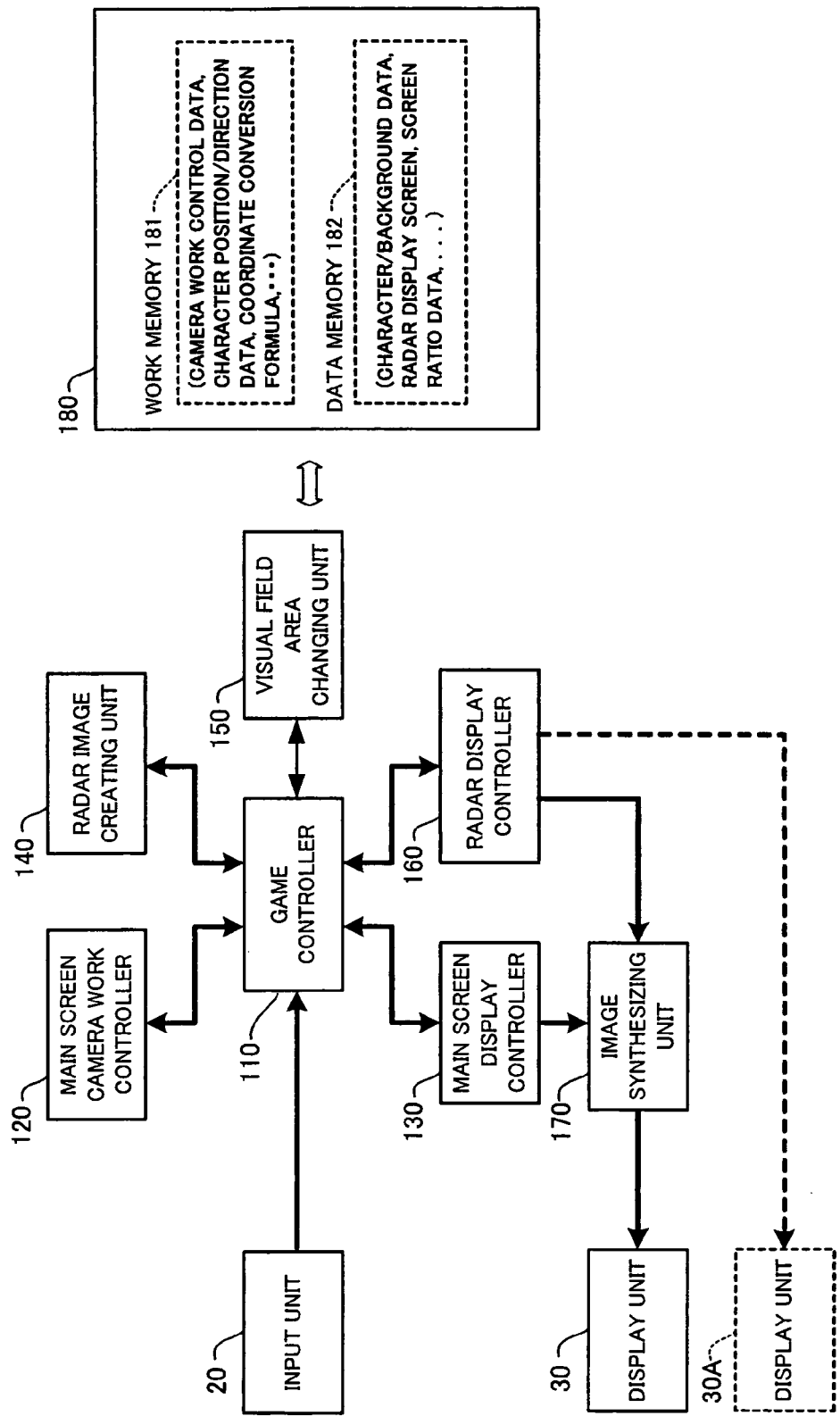
FIG. 2 is a block diagram illustrating one example of a constitution of a main section of software which realizes an image processing function according to the present invention.

FIG. 2 is a block diagram illustrating one example of a constitution of a main section of software which realizes the image processing function according to the present invention. Main components of the controller 10 are a game controller 110 that controls entire movement of a game, a main screen camera work controller 120 that controls camera work of a virtual camera for capturing an object in a virtual three-dimensional space from a first visual point position so as to photograph an image on the main screen of the game, and a main screen display controller 130 that creates image data of a video picture captured from the first visual point position (for example, slightly backward of a player character) in the virtual three-dimensional space by the virtual camera to display the image data as a main screen on the display unit 30. The main screen camera work controller 120 includes a function for changing a shape of the main screen of the game according to a shape of a display unit (screen ratio) or an proceeding condition of the game. The shape of the main screen to be displayed on the display unit 30 changes according to the screen ratio of the display device, for example, and a visual field from the virtual camera is changed into an arbitrary shape such as pyramid or circular cone according to the proceeding condition of the game. The main screen on which an area in the three-dimensional space is projected is formed by the main screen display controller 130 to be displayed on the display unit 30.

The unit relating to the radar image process includes a radar image creating unit 130 that creates a predetermined range where the virtual three-dimensional space is captured from a second visual point position (for example, a position where a periphery of a player character is viewed from above) at a first azimuthal direction, and a visual field area on which an area, where the virtual three-dimensional space is captured from the first visual point position or a third visual point position (for example, the position of the player character) at a second azimuthal direction is projected in the predetermined range, as radar image, a visual field area changing unit 150 that changes the shape of the visual field area according to the shape of the main screen of the game on the display unit 30, and a radar display controller 160 that synthesizes the image on the main screen and the radar image by means of an image synthesizing unit 170 according to the proceeding condition of the game or a display instruction by the player to display the synthesized image on the display unit 30 or displays the radar image independently on a predetermined position of another display unit 30A. The visual field changing unit 150 has a function for changing the shape of the visual field area according to the screen ratio of the display unit independently from a change in the shape of the main screen, and a function for changing the shape of the visual field area according to the shape of the main screen set separately from the screen ratio of the display unit as well as a function for changing the shape of the visual field area of the radar image according to the shape of the main screen of the game. For example, in the case where the shape of the main screen is changed into a shape different from normal game according to a scene of the game, the visual field area changing unit 150 changes the shape of the visual field area according to the shape of the main screen, but can enlarge or reduce the visual field area according to the screen ratio of the display unit independently from the control according to the shape of the main screen. Further, the visual field area changing unit 150 can dynamically change the shape of the visual field area according to the shape of the main screen of the game set by a player or an instruction or the like from the game controller 110 in advance independently from the control according to the screen ratio.

The radar image in this embodiment means an image representing an arrangement relationship of a specified object on a three-dimensional map composing the virtual three-dimensional space. As to the display form, a position relationship and a direction relationship (or one of them) between a mobile object and another object on the map are (is) displayed, only a position/direction relationship between the objects is displayed, and a schematic diagram of the map in this area as the object is displayed together with the mobile object and another object. As the display contents of the radar image, icons (in this embodiment, light spot) representing the player character, another opponent character, an object of impediment and the like are displayed as the radar image together with the schematic diagram of the map in the visual field area as the need arises on a part of the main screen (or display unit of another display device).

At this time, the radar image creating unit 140 creates an image such as the icons representing the objects included in at least one (in this embodiment, the visual field area) of the two areas in the virtual three-dimensional space (the predetermined range and the visual field area projected on the predetermined range) captured from different visual point positions and azimuthal angles so as to display the created image. The radar image creating unit 140 creates an image of the reduced map, for example, as a radar detectable range, or an image representing the objects of characters, impediments and the like as well as the reduced diagram of the map included in the area (the predetermined range) so as to display the created image. At this time, the images are displayed with different colors or density so that the player can discriminate the area in the predetermined range and the visual field area or the objects in the areas. The objects and the like may be displayed so as to be scattered on a three-dimensional visual field area having a shape of pyramid, circular cone or the like, or they may be displayed only on a projected bottom surface.

The main screen display controller 130 and the radar display controller 160 have a coordinate converting processor that converts the position of the object in the virtual three-dimensional space (three-dimensional coordinate) into a position on the screen (two-dimensional coordinate) and a drawing unit. In the case where the main screen is created, in this embodiment, display data for a two-dimensional screen is created from a three-dimensional model expressed by a plurality of polygons.

The storage unit 180 is composed of a work memory 181 and a data memory 182, data relating to execution of application programs are stored therein. The data memory 182 stores player characters, background and information about fixed objects to be displayed in the virtual three-dimensional space as information of polygonal surface unit therein. Further the data memory stores screen data about the main screen, radar image and the like, various image data such as main screen, background image and radar image to be projected on the screen, screen ratio data for switching a visual field according to the screen ratio, various control data and the like therein. On the other hand, the work memory 181 stores camera work control data (parameters relating to the camera work of the virtual camera), position and direction data of the characters including the player character, a coordinate conversion formula for converting polygon data on a three-dimensional world coordinate into polygon data on a two-dimensional screen coordinate, display modes relating to the screen ratio (in this embodiment, a plurality of display modes according to the horizontal/vertical screen ratio such as a first mode where the screen ratio is 4:3 (hereinafter, "standard mode") and a second mode where the screen ratio is 16:9 (hereinafter, "wide-screen television mode")) and the like therein.

The coordinate converting processor as the component of the main screen display controller 130 reads the information about the mobile object such as the player character and the background (in this embodiment, the polygon data about the three-dimensional model expressed by a plurality of polygons) and the related coordinate conversion formula from the data memory 182 so as to convert the coordinate of the polygon data. The coordinate converting processor further executes a coordinate converting process so that the polygon data on the three-dimensional coordinate whose coordinate is converted are projected on the screen. The radar display controller 160 creates a radar image based on the position information in the visual field of the objects in which the radar is projected on the screen from a visual point position of a second virtual camera (position and direction, or information about position and information) using a visual field from the visual point position of the second virtual camera as the radar image to be displayed. At this time, in the case where a radar frame representing a radar detection space or a course frame of a race game is displayed, objects in the frame are replaced by icons such as light spots, marks or colors (symbols which can specify the objects) so that the relative position of the objects in the frame can be discriminated easily in the reduced drawing, and the icons are arranged in the visual field area, so that the radar image is created.

The drawing unit writes polygon data into an image output memory such as a graphic memory, and after writing all the polygon data, reads them, and synthesizes main screen data composed of background and a player character, effect image data and radar image data if necessary, so as to output the image data to the display unit 30.

Information process in the virtual three-dimensional space according to the present invention is explained below. Three-dimensional information is secured as video picture information to be displayed on the display unit 30. That is to say, all positions and shapes of display objects relating to the video picture to be displayed are specified by coordinates in the three-dimensional coordinate space.

A visual point (virtual visual point) is set in an arbitrary position of the virtual three-dimensional space, and the video picture to be displayed on the display unit 30 is a visual scene obtained by projecting a space from the visual point position. The projection means to view the virtual three-dimensional space from the virtual camera, and the projection process is executed based on various parameters such as the visual point position and the azimuthal angle of the virtual camera, and visual field area. The visual point position of the virtual camera can be set in an arbitrary position in space. The visual point position is sequentially moved, so that the video picture displayed on the display unit 30 also changes gradually. At this time, a viewer of the display unit 30 feels like moving in the virtual three-dimensional space. Further, information about a light source can be also included in the virtual three-dimensional space. When the position of the light source is specified, shade is specified on information about objects to be displayed in the space.

As to the camera work of the virtual camera for the main screen, the virtual three-dimensional space is projected from an arbitrary position such as a position separated from a mobile object to be tracked by a predetermined distance or a position of the player character like a manner that the mobile object which moves in response to an operation by the player is tracked. The parameters relating to the camera work of the virtual camera such as an object to be tracked, movement of the virtual camera, position and azimuthal angle of the virtual camera, and a distance between the player character and the virtual camera (zoom-up and zoom-out) are automatically changed according to the position of the player character in the virtual three-dimensional space and the scene of the game, and is changed by the operation by the player. For example, the direction and the position of the virtual camera automatically change according to the proceeding condition of the game, and change according to the direction and the position of the player character to be moved in response to the operation by the player, or an operation relating to the visual angle in right, left, up and down directions. Elements which change the parameters are determined based on the position of the player character, the scene of the game and the like.

In this embodiment of the present invention, the visual field direction of a video picture on the main screen can be rotatively moved to any directions in the virtual three-dimensional space about the first visual point position as a center independently from the advancing direction of the mobile object which moves in the virtual three-dimensional space in response to the operation by the player. The radar image creating unit 140 creates an image in a visual field area which is projected in a predetermined range in a manner that the visual field area is rotationally moved in conjunction with the rotational movement of the video picture and is captured from that direction. The rotational movement is controlled based on the control information about the camera work in the main screen camera work controller 120, but a radar display camera work controller may be provided to control the rotational movement independently from the camera work on the main screen.

There are some methods of expressing an object to be displayed in the virtual three-dimensional space. The typical two methods are a polygon process and a patch process. The polygon process is a method of structuring a three-dimensional space by means of plural polygons. That is to say, in this method, an object to be displayed is regarded as aggregate of plural polygonal plates and information is stored by polygon unit. On the other hand, the patch process is a method of structuring a three-dimensional space by means of plural curved surfaces. According to this method, a three-dimensional space composed of smooth curved surfaces can be structured easily, but its computing takes a longer time than the polygon process. As to the effect screen of the present invention, any one of the methods may be used. In this embodiment, as to the player character and the background, the three-dimensional space is expressed by the polygon process.

The image process utilizing polygons is explained as an example. The portion relating to the virtual three-dimensional display is explained in detail. The coordinate converting processor 151 reads the information about the fixed object to be displayed relating to the background stored in the data memory 182, the position of the player character and the position of the visual point stored in the work memory 181, and the coordinate conversion formula relating to them, and converts the information about the fixed object to be displayed such as the background into coordinates based on the relative visual point position of the virtual camera with respect to the player character at that time. Further, the coordinate converting processor executes the coordinate converting process so that the polygon data on the converted three-dimensional coordinate is projected on the screen. The information obtained as a result is transmitted to the drawing unit, so that image data are created by using a degree of transparency, brightness, colors and the like as parameters. As a result, a three-dimensional video picture is projected on the display unit 30.

The embodiment where the radar display camera work controller is provided to process the radar image is explained. In this embodiment, a radar image is created based on at least two areas in the virtual three-dimensional space captured from different visual point positions and azimuthal angles, but the camera work relating to the visual field area is explained here. As to the camera work of the second virtual camera (radar display virtual camera), a first visual point position (for example, an upper-backward position of the player character) or a third visual point position (for example, the position of the player character or a radar center position at which a target of shooting or the like is captured) is used as the visual point position of the second virtual camera, an image pickup area (a visual field area whose the shape is changed by the visual field area changing unit 150) such as a wide visual field captured from the entire movable area, a periphery of the mobile object or the visual point position is photographed from a predetermined direction according to the moving condition of the mobile object moving in the virtual three-dimensional space and the proceeding condition of the game.

As the arrangement relationship of a specified object, a position relationship between the object of a self character and another object (another mobile object, impediment, whole or part of the map, and the like) is obtained based on three-dimensional position information representing the position (and the direction) of a player character (self mobile object) and another object in the visual field where the virtual three-dimensional space is overlooked from the second visual point position, for example. An image representing the position relationship is created as an image in the visual field area. At this time, the radar image creating unit 140 synthesizes an image for determining the standards such as a concentrical line and a cross line in a circular frame in the case of radar display where radar is patterned or an image representing a shape of a course map in the case of a map showing a course such as a driving course and a maze (an image in a predetermined range of the map) with the image in the visual field area so as to create a radar image. At this time, icons which present the position of the object such as a player's machine, an opponent character and an impediment included in the predetermined range or the position and the direction (simplified symbols such as light spots or marks) are displayed in that area.

The display form of the radar image in the above constitution according to the present invention is explained below with reference to the pattern diagrams. In the present invention, a shape of visual field display in the virtual three-dimensional space is changed according to the shape of the game screen so that the range actually in the visual field matches with the visual field display of the radar.

Figures 3A, 3B:
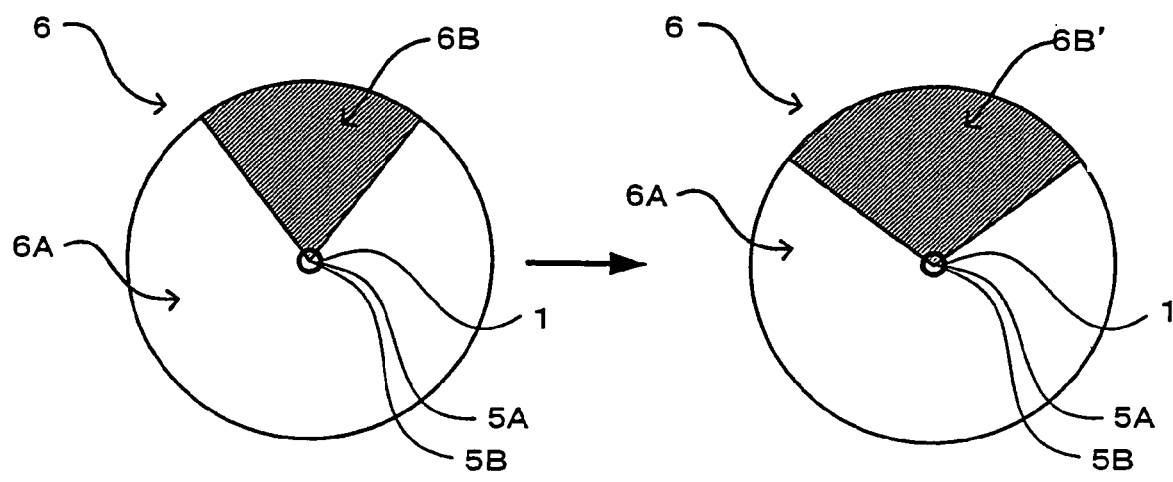
FIGS. 3A and 3B are pattern diagrams for explaining a radar image display control system and a first display form according to the present invention.

In FIGS. 3A and 3B, visual field areas 6B and 6B' in the standard mode and the wide-screen television mode are shown by slanted lines. In this embodiment, as shown in FIG. 3A for example, a predetermined range 6A where the virtual three-dimensional space is captured from a second visual point position 5A at the first azimuthal angle (in this example, a circular range where a peripheral of a player character 1 is captured from above the player character 1), and a visual field area 6B where an area captured from the first visual point position of the main screen (for example, a backward position of the player character 1) or a third visual point position 5B at the second azimuthal angle is projected in a predetermined range 6A are displayed as a radar image 6. In this example, the circular range 6A in FIG. 3A where the periphery of the player character 1 is captured from the visual point position 5A above the player character 1 in a conical or cylindrical visual field, and the fan-shaped range 6B in FIG. 3A where a front portion in the position of the player character 1 as the visual point position 5B is captured in a conical visual field to be projected in the circular range 6A are displayed as the radar image 6.

In the case of the wide-screen television mode, as shown in FIG. 3B, a field angle in a horizontal direction, for example, is increased to be 4/3 times larger than the visual field 6 in the standard mode, and is projected in the predetermined range 6A. An area 6B' where the visual field area in the horizontal direction is increased according to the screen ratio of the display device (an area where the horizontal width of the visual field area is widened) is the visual field area. On the game screen, like a case of a rectangular display device having a circular display screen, the game screen is occasionally constituted so as to have a shape different from the screen shape of the display device. In this case, the visual field area has a conical shape in the case of the circular game screen, and a sectional shape of the visual field area has an enlarged circular or elliptic shape in the case of the wide-screen television mode.

Figures 4A, 4B:
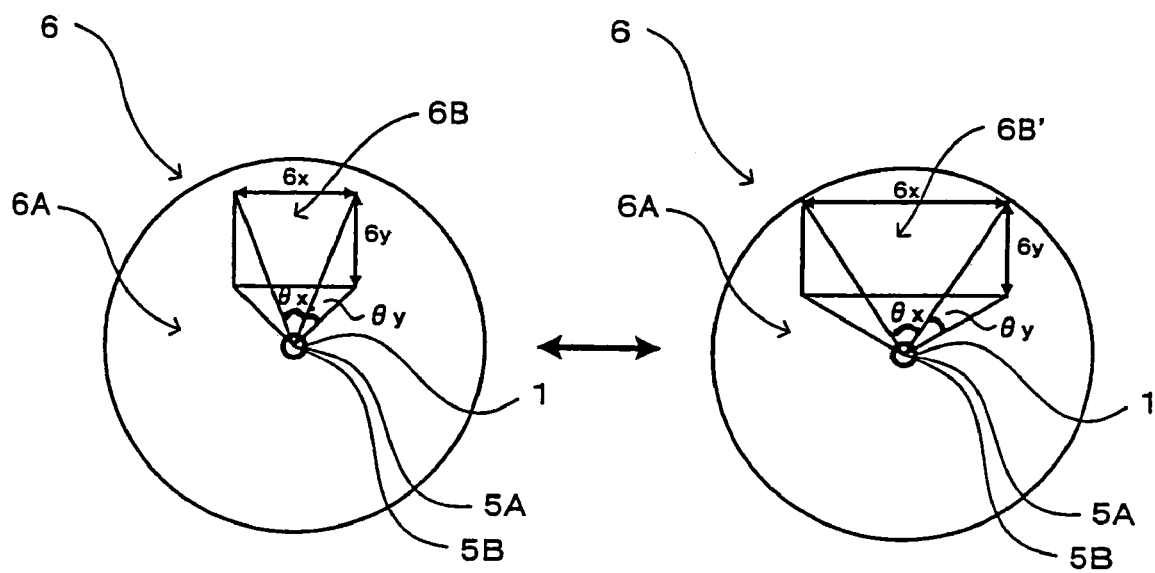
FIGS. 4A and 4B are pattern diagrams for explaining the radar image display control system and a second display form according to the present invention.

FIGS. 4A and 4B are pattern diagrams illustrating another display forms of the radar image. In this example, as shown in FIG. 4A, the visual field area has a pyramid shape (in this example, quadrangular pyramid), and an area captured at an azimuthal angle slanted with respect to the horizontal direction is projected in the predetermined range 6A so as to form the visual field area. The respective objects are displayed within the pyramid or on a pyramid-shaped bottom surface. In the case of the wide-screen television mode, the radar display controller 160 changes the shape of the visual field area 6B into 6B' shown in FIG. 3B so that the quadrangular pyramid-shaped bottom surface to be the visual field area of the virtual camera matches with the screen ratio in the display device. More concretely, the visual field area changing unit 150 calculates visual field display 6$y$ in the vertical direction (or visual field display 6$x$ in the horizontal direction) based on a vertical field angle $\theta y$ (or horizontal field angle $\theta x$) of the second virtual camera, for example, and calculates the visual field display 6$x$ in the horizontal direction (or the visual field 6$y$ in the vertical direction) based on the visual field display and the aspect ratio of the screen, so as to set the visual field display 6$x$ and the visual field display 6$y$ as the visual field display area. The radar image creating unit 140 creates the radar image from the visual field display area whose shape is changed. This case is applied to the case where the game screen is rectangular, and in the case where the game screen in the standard mode is circular, the shape of the visual field area is conical according to the circular shape of the game screen (the shape of the bottom surface is circular). In the case of the wide-screen television mode, the field angle in the horizontal direction is enlarged, so that the shape of the bottom surface is changed into an elliptic shape. The switching into the modes according to each screen ratio (in this example, the standard mode and the wide-screen television mode) can be automatically carried out by setting a selecting operation by the player or according to a signal or the like to be input from the display device.

The visual field direction of the video picture on the main screen can be rotationally moved so that the player can look round in all directions in the virtual three-dimensional space with the first visual point position being the center independently from the advancing direction of the mobile object. The radar display controller 160 controls the rotational movement of the radar image in conjunction with the rotational movement on the main screen under the camera work of by means of the radar display camera work controller 140. That is to say, separately from the advancing direction of the mobile object (player's machine) to be operated by the player, the visual field direction can be rotationally moved (look around) with the player's machine being the center, for example. The visual field display portion in the radar display (or the display contents of the visual field display portion) is also rotationally moved to be displayed in conjunction with the video picture of the main screen. The visual field direction is rotationally moved according to the proceeding condition of the game, and the position and the direction of the mobile object as well as the operation by the player.

Figure 5:
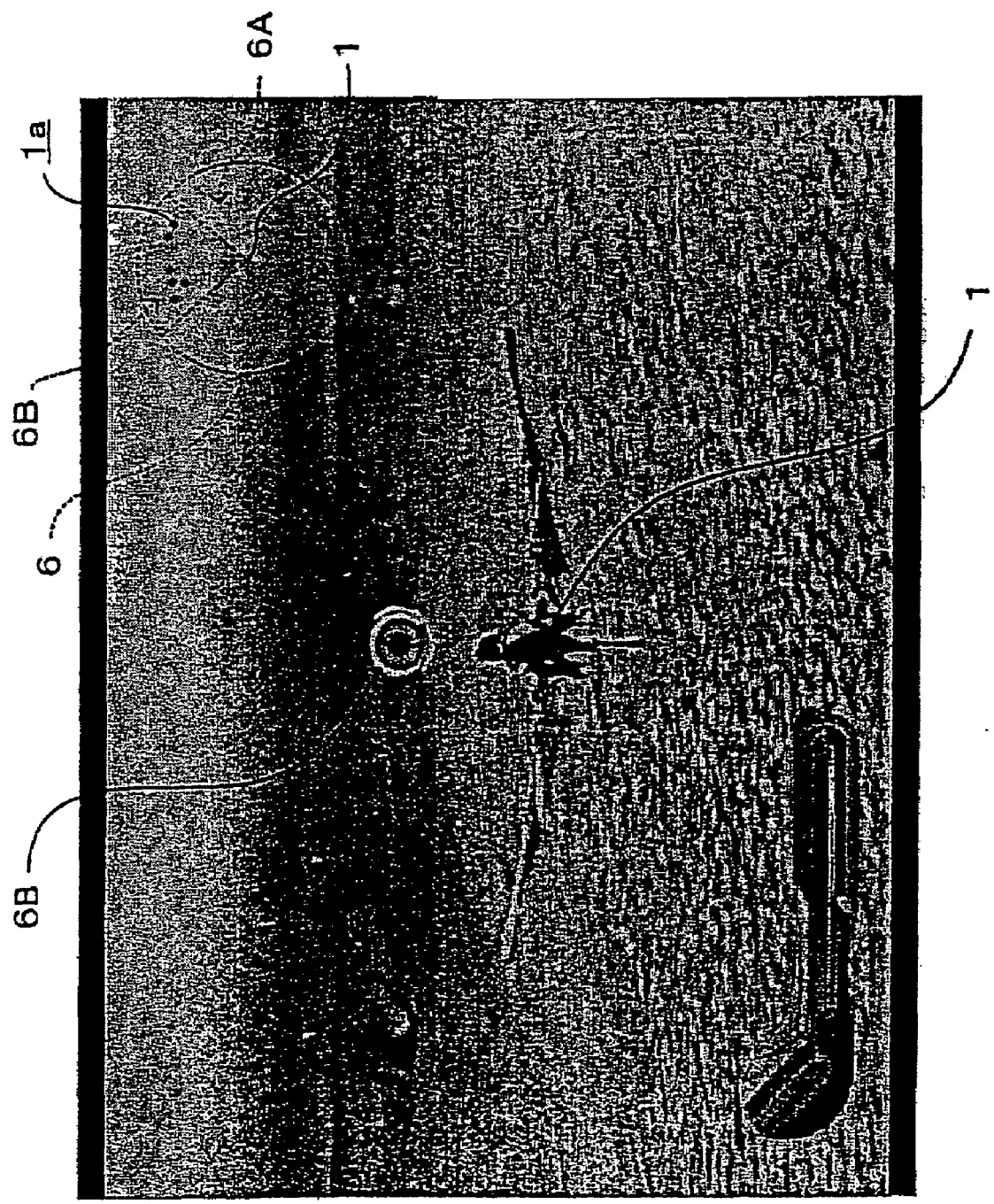
FIG. 5 is a diagram illustrating a main screen of a game and a first example of the radar image in a standard mode.

FIGS. 5 to 8 illustrate concrete examples of the main screen of the game the radar image in the standard mode, and the relationship between the main screen of the game and the radar image is explained with reference to these drawings. FIG. 5 illustrates a screen example of a shooting game in the present invention, and a player character 1 which rides on a dragon can freely move in space by changing the advancing direction according to the operation by the player. Further, independently from the advancing direction, a firing range 6B where an opponent character is captured can be operated to any directions. This game proceeds in such a manner that an opponent character which flies in space or moves on the ground is captured in the firing range 6B and is destroyed. In this example, the quadrangular pyramid-shaped visual field area 6B (see FIG. 4) which covers from the visual point position, which is the position of the player character 1, to the rectangular surface is the firing range. In this case, as shown in an upper-right portion of FIG. 5, as the radar screen 6, for example, the periphery of the player character 1 and the opponent character included in its range are captured from the visual point position above the player character 1, and an image 6A in this range and the icons representing the dragon as the player's machine, the player character 1 and the opponent character (1a in FIG. 5 designates the icon of the opponent character) are displayed. The visual field area 6B (the firing range) where the area captured from the player character 1 (position of a weapon) is projected in the range, and the icon representing the opponent character included in the quadrangular pyramid-shaped area are displayed on the radar screen 6.

Figure 6:
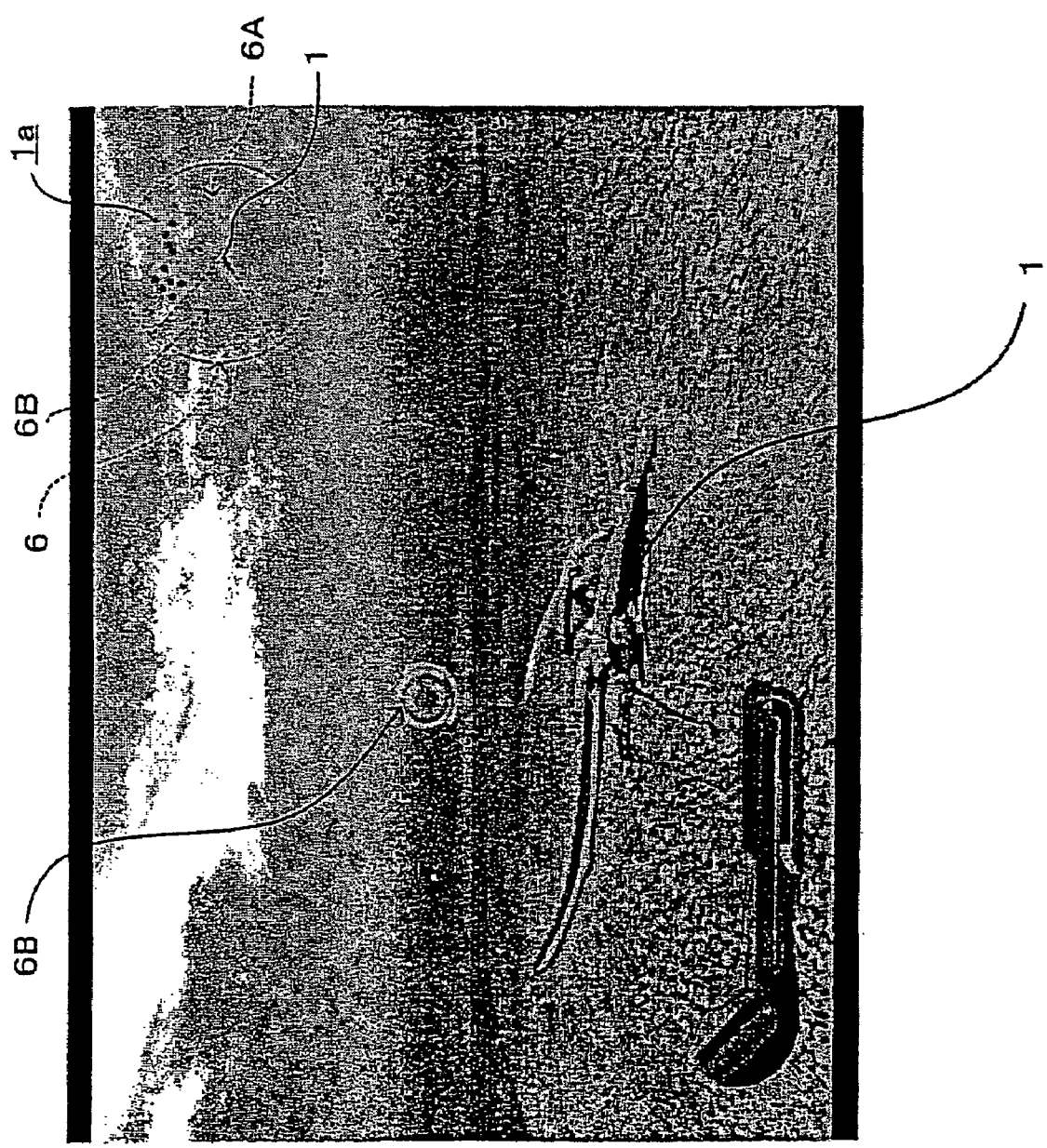
FIG. 6 is a diagram illustrating the main screen of the game and a second example of the radar image in the standard mode.
Figure 7:
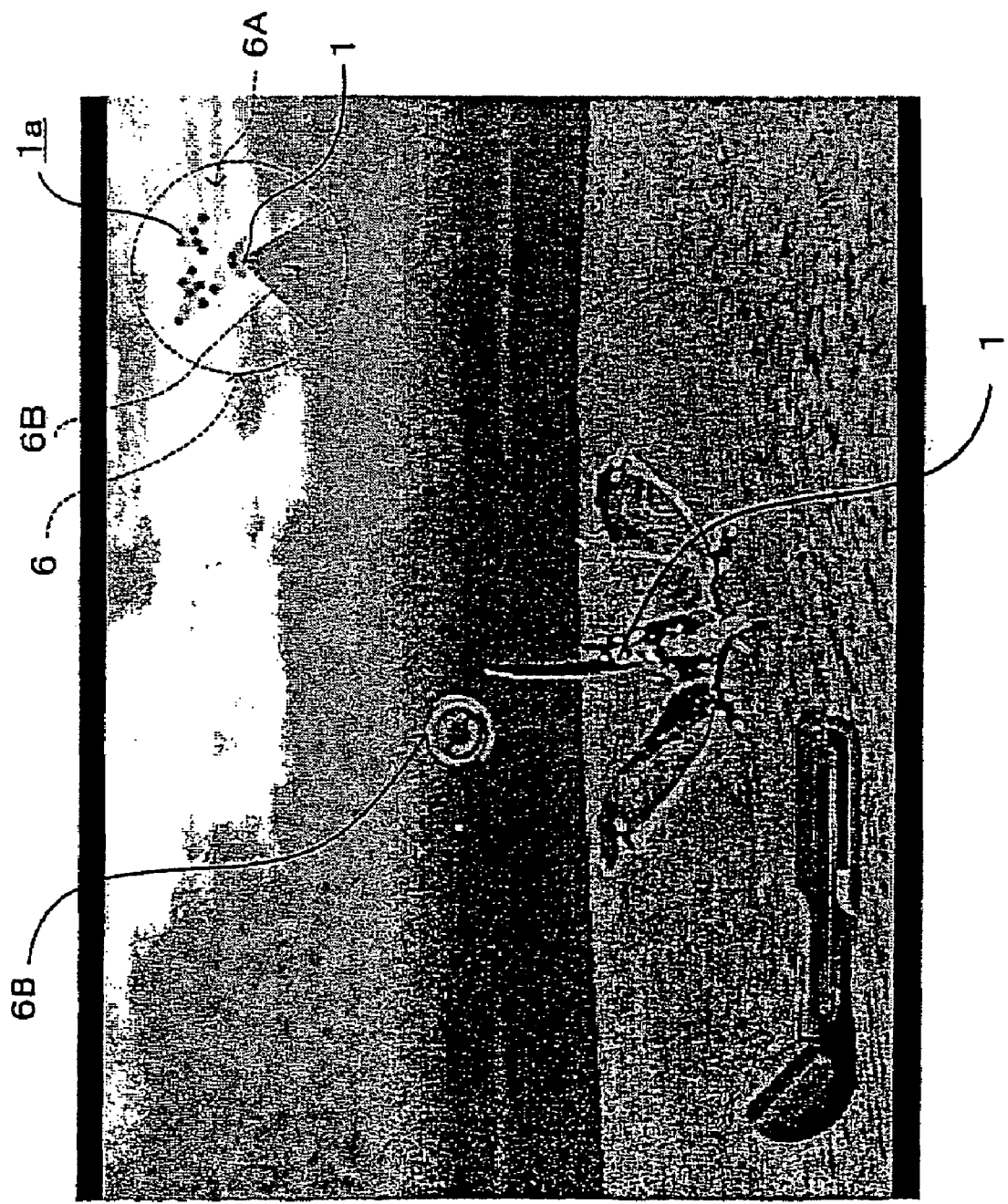
FIG. 7 is a diagram illustrating the main screen of the game and a third example of the radar image in the standard mode.
Figure 8:
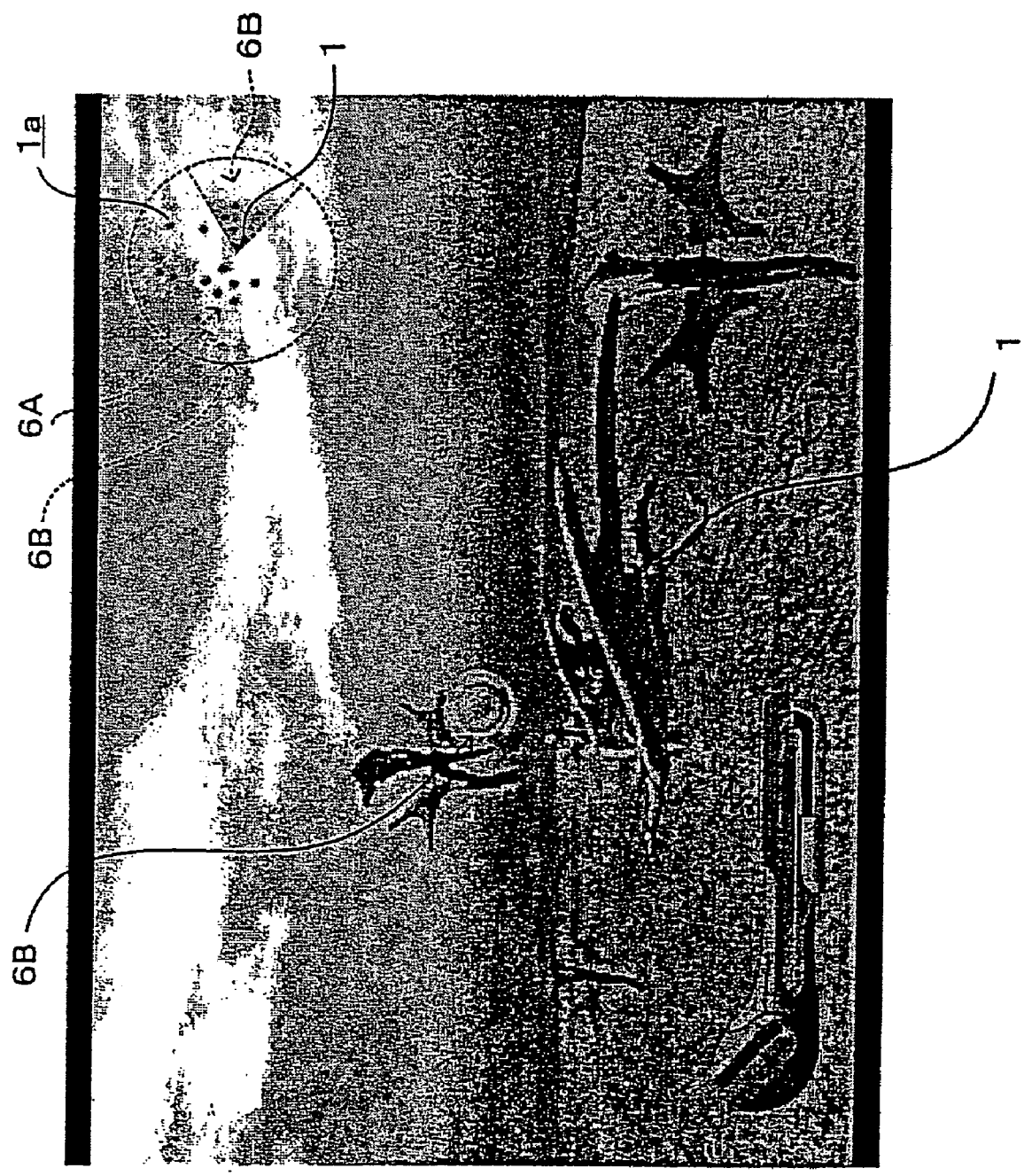
FIG. 8 is a diagram illustrating the main screen of the game and a fourth example of the radar image in the standard mode.
Figure 9:
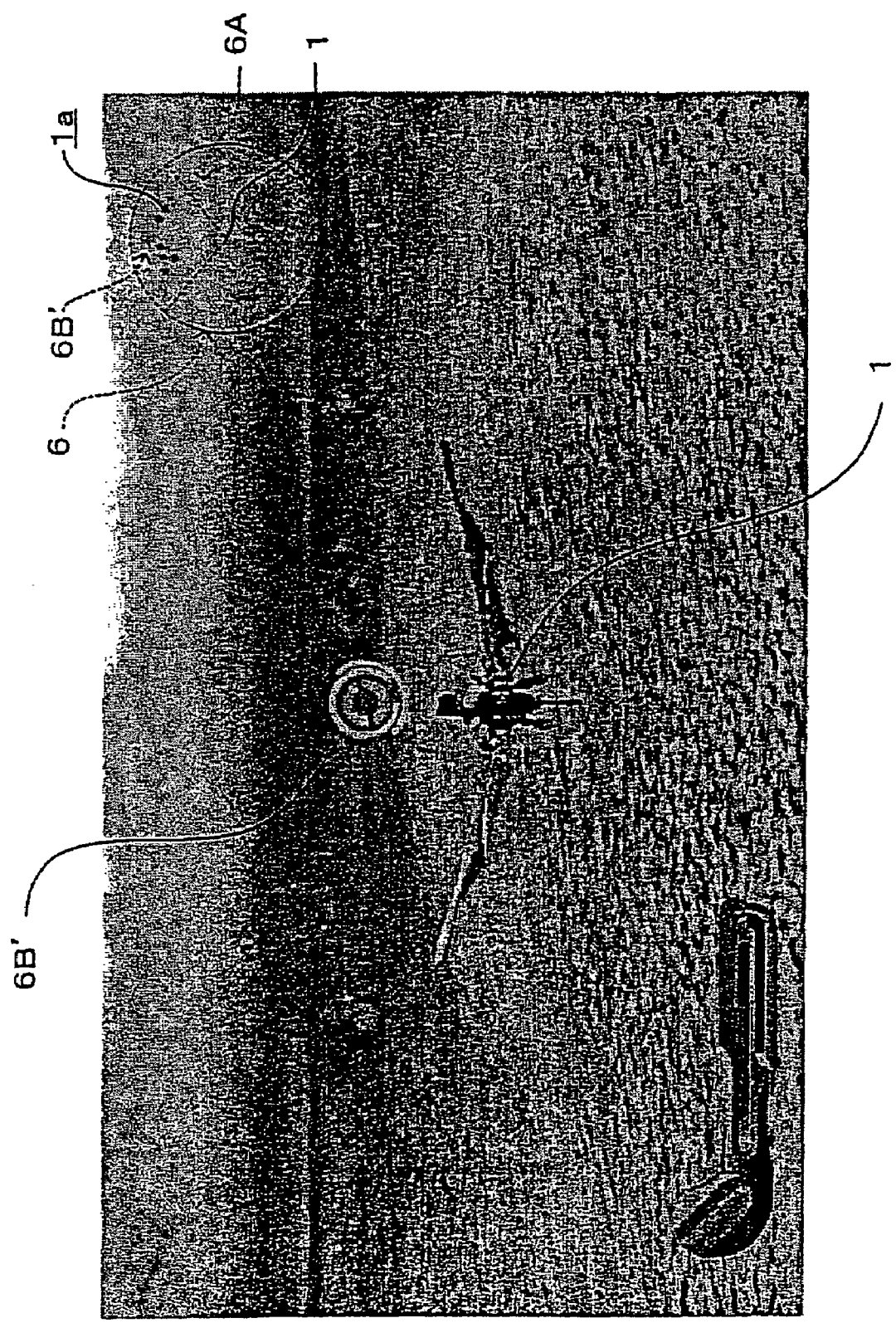
FIG. 9 is a diagram illustrating a main screen of the game and a first example of the radar image in a wide-screen television mode.
Figure 10:
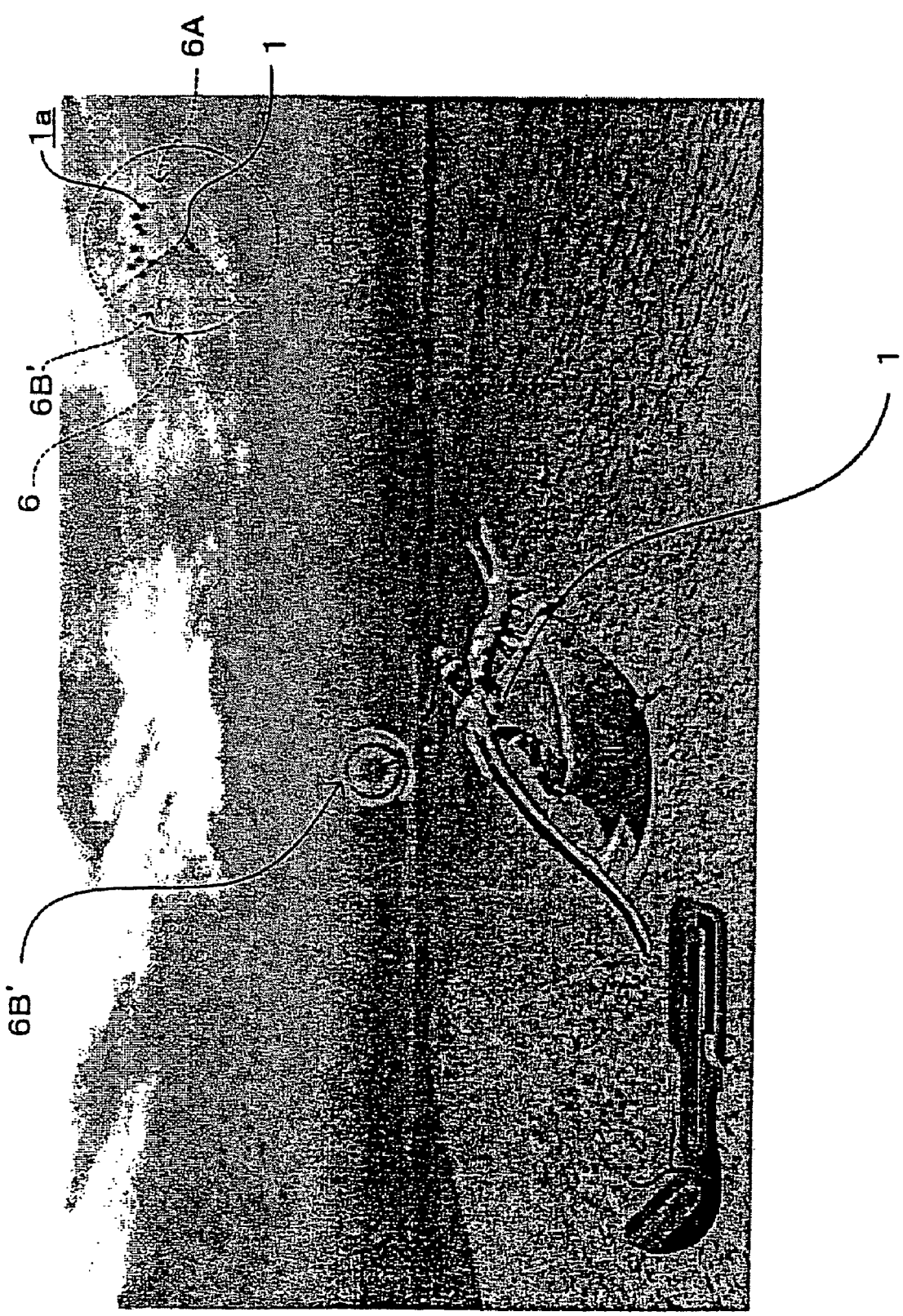
FIG. 10 is a diagram illustrating the main screen of the game and a second example of the radar image in the wide-screen television mode.
Figure 11:
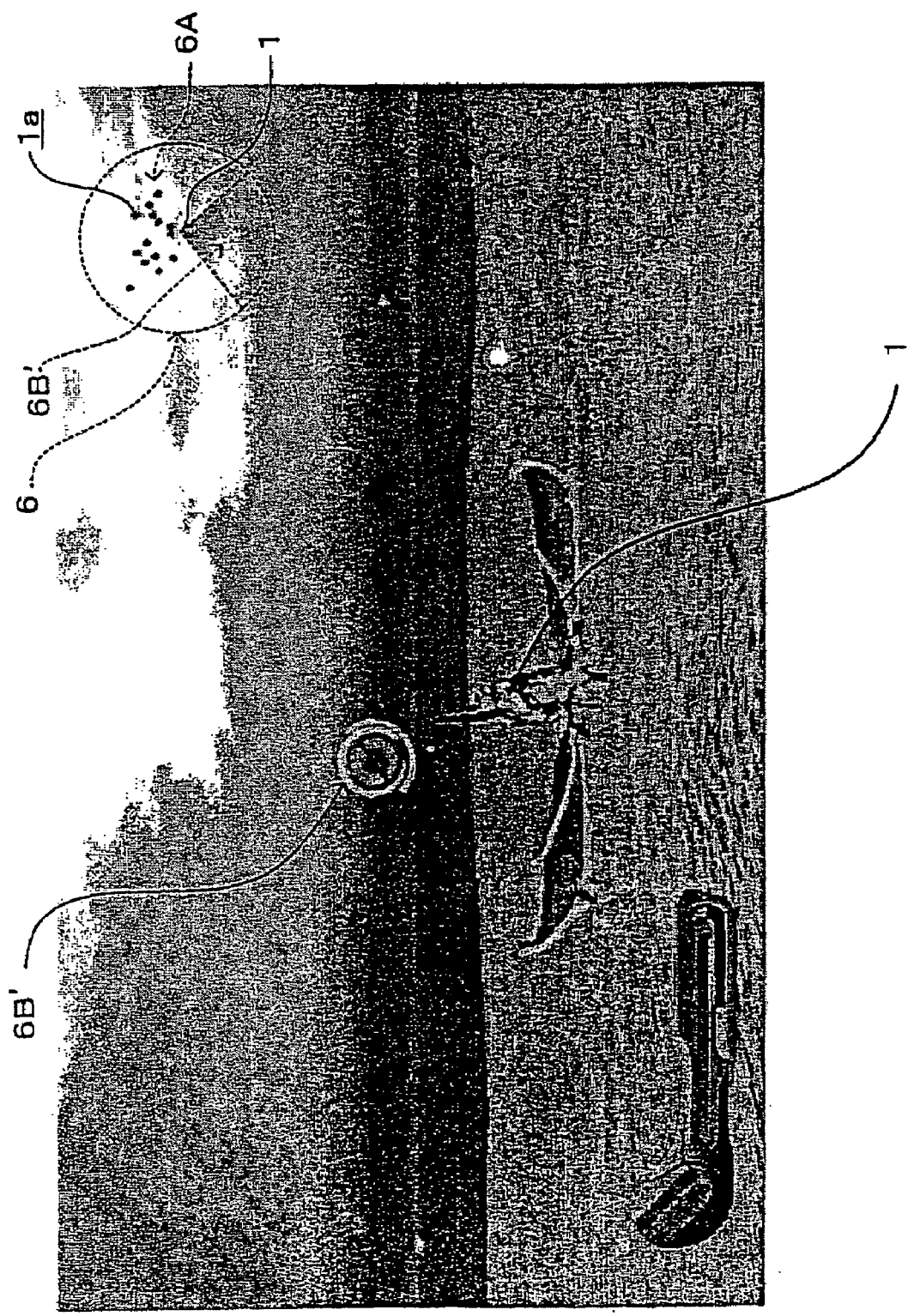
FIG. 11 is a diagram illustrating the main screen of the game and a third example of the radar image in the wide-screen television mode.
Figure 12:
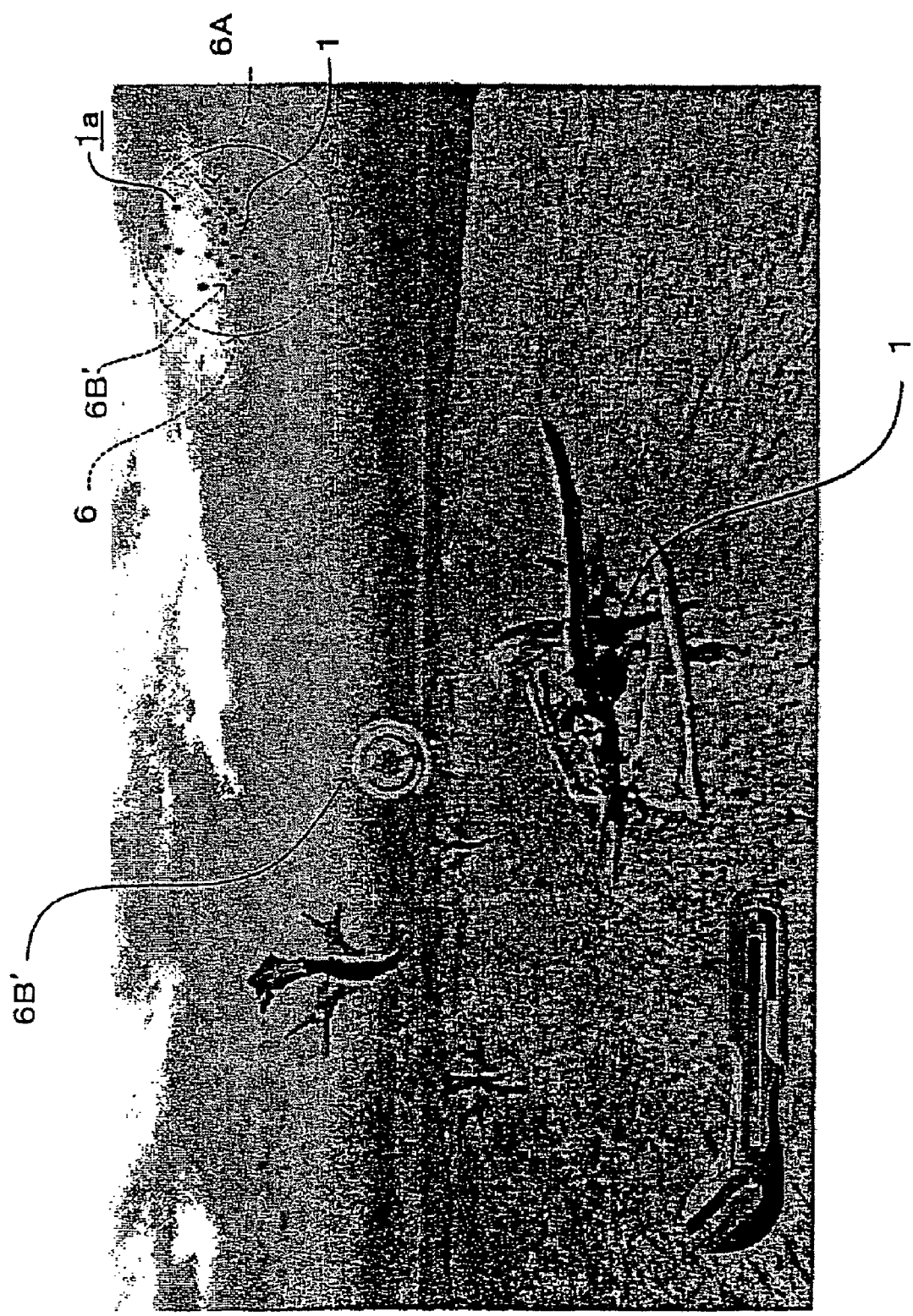
FIG. 12 is a diagram illustrating the main screen of the game and a fourth example of the radar image in the wide-screen television mode.

As to the radar image 6 in this example, the player character 1 is displayed with its direction and position being fixed so that the advancing direction of the character 1 is always an up direction, whereas the visual field area 6B showing the firing range is rotationally moved about the player character 1 to be displayed. On the other hand, as shown in FIGS. 6 to 8, on the main screen, the visual point position is switched sequentially according to the change in the direction of the player character 1 in such a manner that the direction of the player character 1 is changed to the right side, the front side and the left side from the back side of the screen, and the visual field from the visual point position is displayed. In this example, in order to recognize the firing range (visual field area 6B) at one glance on the main screen, as shown in FIGS. 5 to 8, the player character 1 is photographed from the front side of the game screen, and the direction of the player character 1 is changed relatively with respect to the firing range direction so that the firing range 6B is displayed in a fixed manner on an approximately center portion on the back side of the game screen. As to the radar image 6, on the contrary to the main screen, the direction of the player character 1 is fixed, and the direction of the firing range (visual field area 6B) is changed relatively.

FIGS. 9 to 12 illustrate concrete examples of the main screen of the game and the radar image in the wide-screen television mode correspondingly to FIGS. 5 to 8. In the case of the wide-screen television mode, as shown in the examples of FIGS. 9 to 12, the shape of the game screen is changed according to the screen ratio of the display unit (in this example, enlarged to the horizontal direction), and accordingly the shape of the visual field area 6B' is changed. In this example, as to the firing range 6B' to be displayed in the main screen of the game, the visual field (field angle) is enlarged according to the screen ratio of the display unit, but this portion may be fixed.

Figure 13:
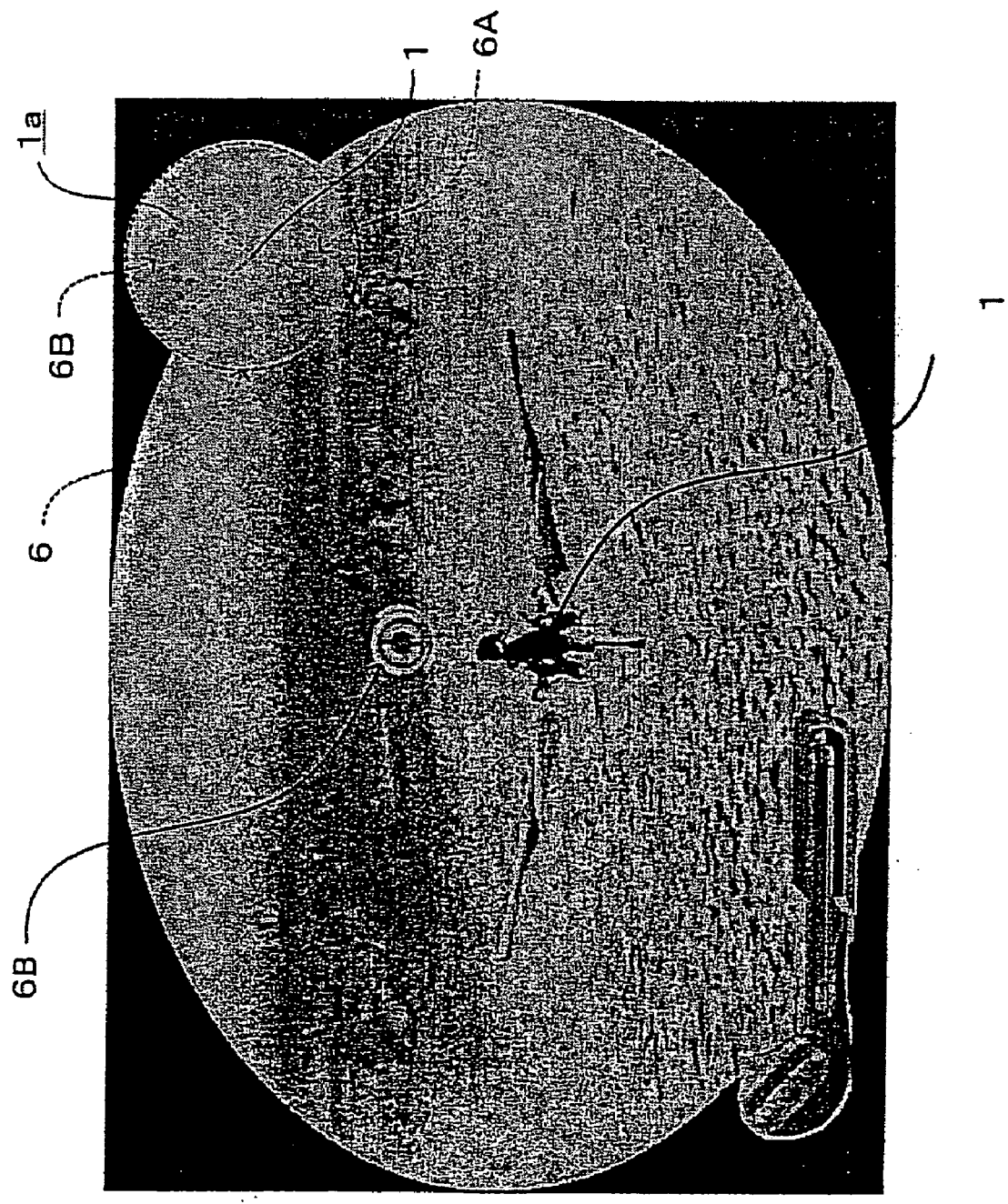
FIG. 13 is a diagram illustrating the main screen of the game and a first example of the radar image in another display form.

FIG. 13 illustrates a screen example in the case where the shape of the main screen is changed into a shape different from that in the normal game according to the proceeding of the game. For example, in like a case where spot light display in a dark place is simulated, as shown in FIG. 13, a video picture which is captured in the conical visual field (in this example, a projection surface is elliptic) from the first visual point position in the virtual three-dimensional space is displayed. In this case, the visual field area 6B where the visual field area of the radar image is changed from its original shape (for example, quadrangular pyramid shape) into the conical shape is displayed as the radar image 6.

For example, due to the processing of the game, in order to express that the visual field of the player is limited (in order to change the visual field area 6B according to passage of time and a moving position in the moving area in like a case where the player advances a dark place and a foggy place), the shape of the display screen is changed so that a range which is narrower than the normal range is occasionally displayed. This is achieved by controlling the image display so that an image on the portion out of the visual field is displayed with a color and a shape which are different from those of an image to be originally displayed when the normal display range is displayed on the display screen. For example, in FIG. 13, pixels of only black are displayed in a fixed manner on the outside of the circular visual field, so that the player cannot view the portion out of the visual field. For this reason, when the display image is created, the pixels on the portion corresponding to the outside of the visual field are replaced by black pixels, or after a normal display image is temporarily created to be displayed, a mask image which is constituted so that the display image transmits through only the visual field range (it has only black color, and an effect image or the like such as another color, rain or fog may be used according to requirements of representation in the game) is overlapped. In another method, a known image effect (blur, color change, etc.) which makes the visual field on the pixels out of the visual field impossible or difficult may be used. Further, in FIG. 13, the portion out of the visual field has only black color and thus visibility is disabled, but a semi-transparent mask image is superposed so that the visibility may be made to be difficult.

Further, the visual field range is occasionally changed to be a closer range than the normal range due to representation of the game proceeding. For example, in order to express a foggy or dark situation, an effect is given to an object in a position separated from the visual point position by a not less than predetermined distance, its color is changed, or this object is not displayed, thereby disabling the visibility of the player on the normal display screen (in this case, an icon may be displayed on the radar screen). In this case, the image in the visual field range which is displayed on the radar screen is also deformed or reduced according to a display distance. For example in FIG. 3A, a radius of the fan shape in the visual field range 6B is reduced. In another manner, in FIG. 4A, the image is deformed so that a distance from the apex of the quadrangular pyramid on the visual field range 6B to the bottom surface becomes short.

For example, when a maximum detection range of the normal radar includes a circumference portion shown by numeral 6 in FIG. 3, if the visual field range does not reach the circumferential portion according to the game proceeding, an arc of the visual field range image 6B is deformed so as to be separated to the inner side of the circumference of the circle 6 by a distance corresponding to the visual field range.

Figure 14:
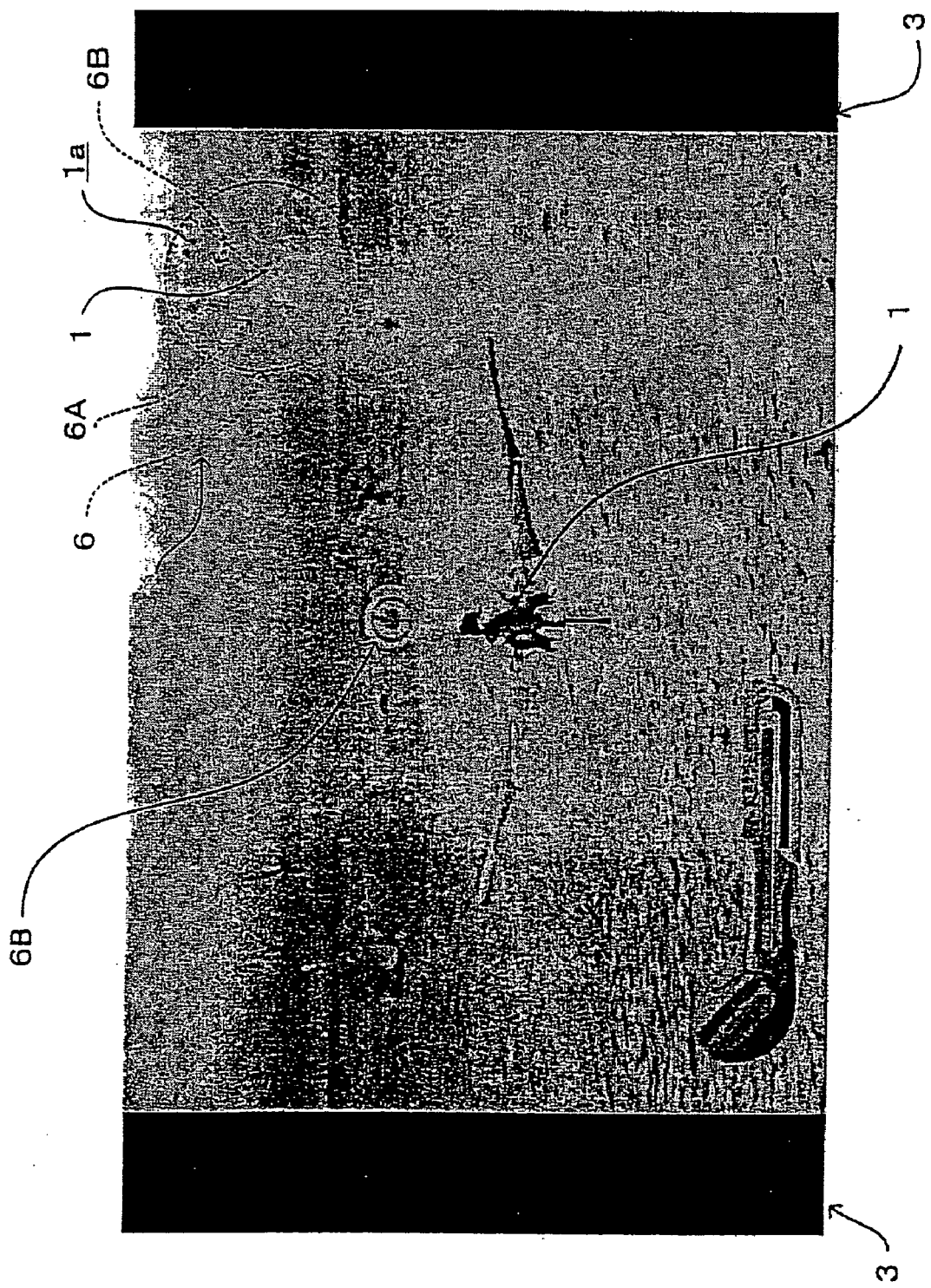
FIG. 14 is a diagram illustrating the main screen of the game and a second example of the radar image in another display mode.
Figure 15:
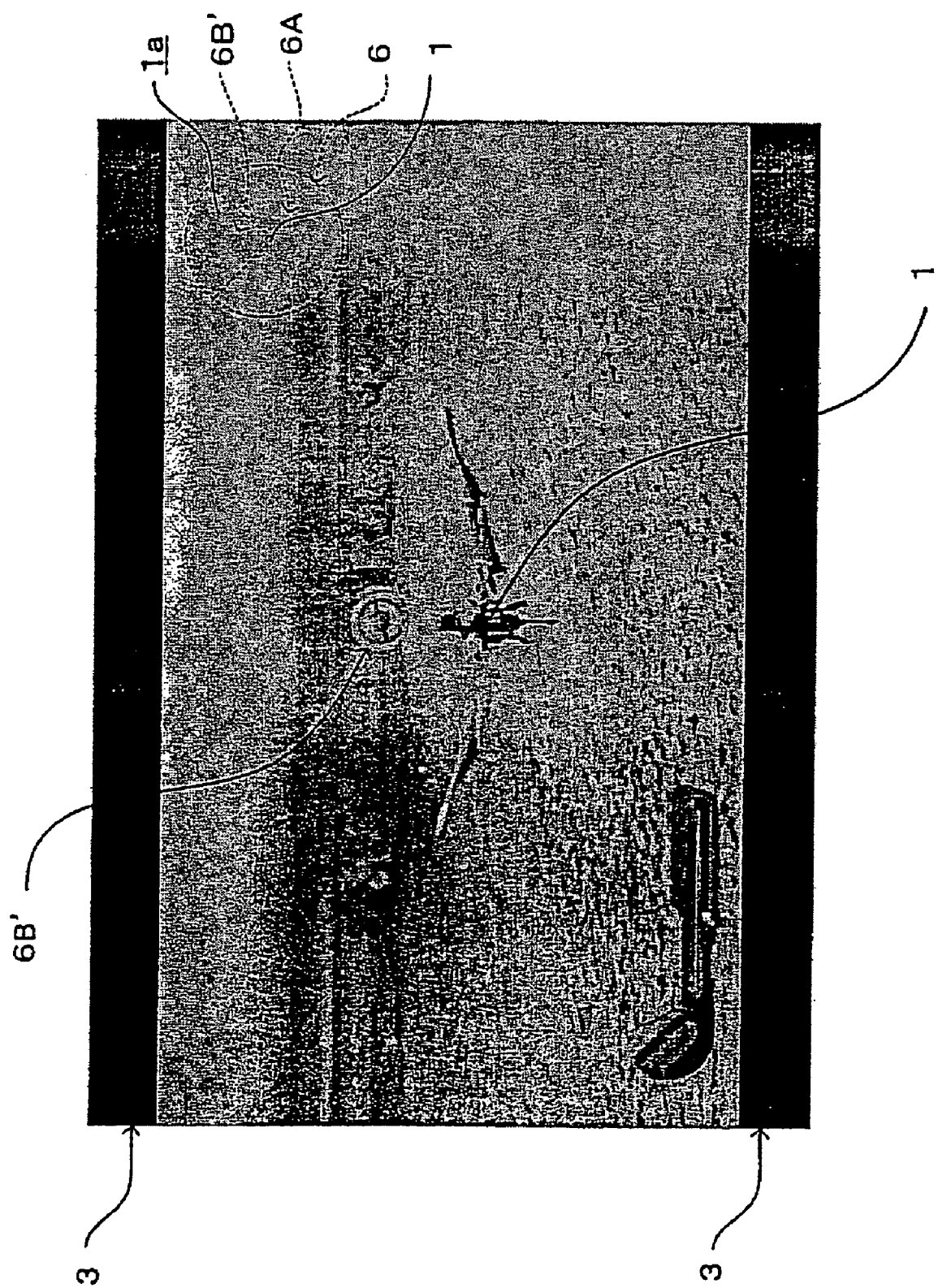
FIG. 15 is a diagram illustrating the main screen of the game and a third example of the radar image in another display mode.

FIGS. 14 and 15 illustrate screen examples in the case where the shape of the main screen is set without taking the screen ratio of the display unit into consideration. The shape of the main screen changes according to the game proceeding and the screen ratio of the display unit as mentioned above, but the shape can be set by another method. FIG. 14 illustrates the example where the main screen is displayed with ratio of 4:3 on a wide-screen television whose screen ratio is 16:9, and in this case, the main screen in FIG. 14 is displayed on the screen of the display device. In this example, the main screen of the game is displayed in a predetermined position (the screen center portion in FIG. 14), and right and left portions are black, namely, non-display portions. Areas 3 other than the main screen are, however, used as "a display portion not for the objects in the virtual space but for arbitrary game information" such as score or residual machines display portion or a radar display portion. FIG. 14 illustrates the example in the case where the main screen of the game is displayed with ratio of 16:9 on a television whose screen ratio is 4:3, and similarly areas 3 other than the main screen are used as non-display portions or display portions for game information. In these cases, the field angle in the visual field area of the radar image is adjusted according to these settings, and a portion of the visual field area 6B (6B') is displayed on the radar screen.

Like in FIGS. 13 and 14, the inside and the outside of the visual field range are distinguished as display and non-display portions (only black) on the display screen, a border between the inside and the outside of the visual field range is clarified, but actually the inside and the outside of the visual field are not always clearly distinguished, and its border is mostly vague. In order to express this situation, therefore, semi-transparent pixels of the mask image for the outside of the visual field range are displayed, for example, on the border portion between the inside and the outside of the visual field range, and thus the border does not have to be distinguished clearly. Further, the outside of the visual field range is not uniformly subject to the effect process such as coloring with simple color, but it is subject to the image process such that transparency of the portion close to the inside of the visual field range is heightened, and the transparency is lowered sequentially or gradually towards the outside of the visual field range. In another method, the outside of the visual field range is subject to the image process such that a stronger effect is given to the outside of the visual field range to an outward direction, so that the inside and the outside of the visual field range may be made to be vague. As a result, when the image whose visual field is limited is displayed, the more real image can be provided. In this case, also in the visual field display image on the radar image may be subject to such an image process that it does not have a clear shape like the visual field area 6B shown in FIG. 3 but its outline portion is blurred.

Figure 16A:
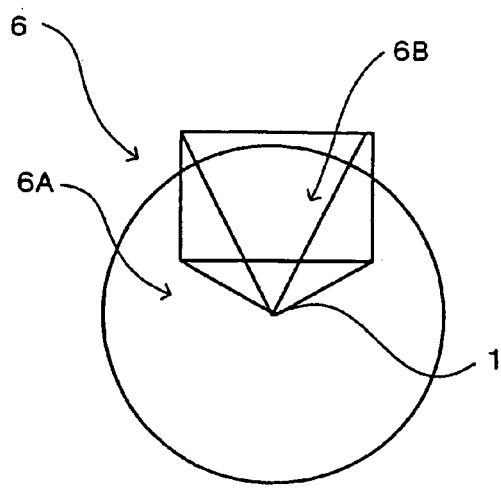
FIGS. 16A to 16C are pattern diagrams illustrating concrete examples in the case where a shape of a visual field area of the radar image is displayed three-dimensionally.
Figure 16B:
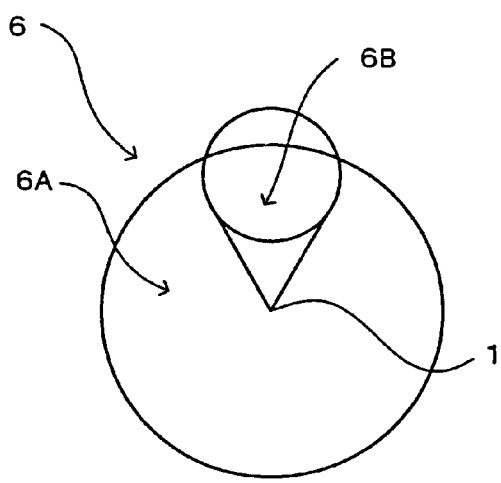
Figure 16C:
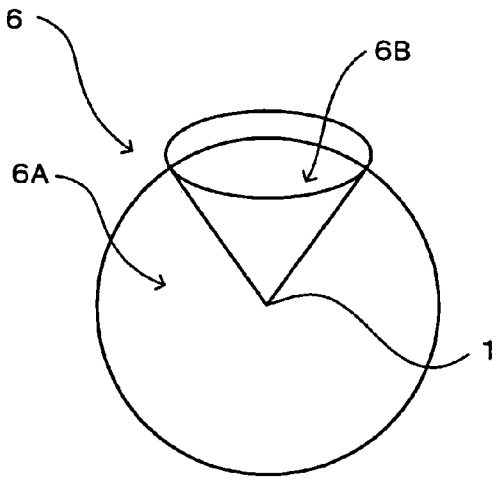

In the concrete examples of the radar image shown in FIGS. 5 to 15, the shape of the visual field area 6B (6B') is expressed by a fan shaped plane, but as shown in FIGS. 16A, 16B and 16C, it may be expressed by three-dimensional shapes such as a quadrangular pyramid shape, a conical shape and an elliptic conical shape. Further, the drawings illustrate the examples that the visual point position corresponding to the visual field area 6B and the visual point position corresponding to the predetermined range 6A are displayed in a fixed manner, but these positions can be changed arbitrarily in conjunction with the main screen of the game or independently from the main screen of the game.

Figure 17:
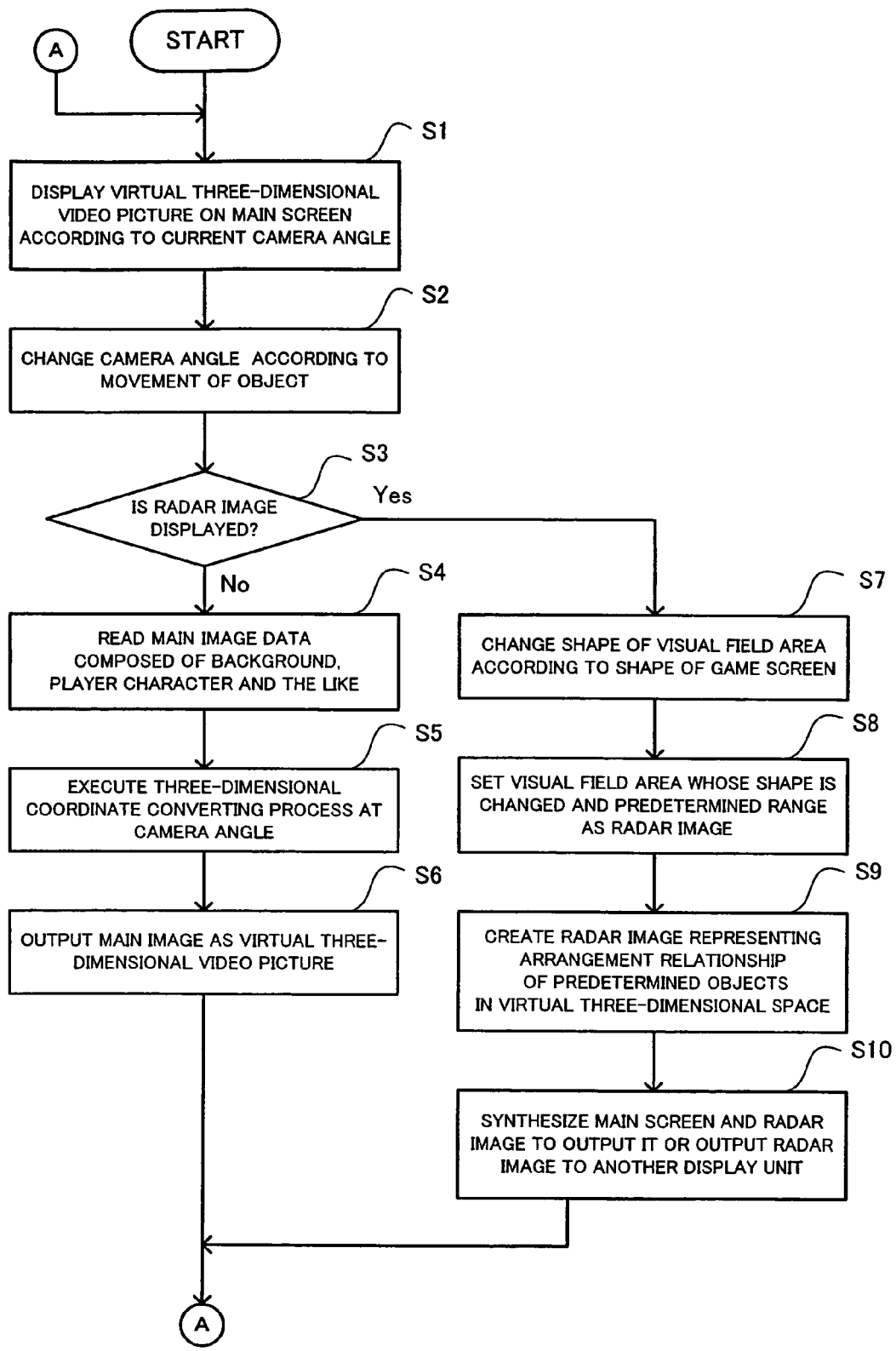
FIG. 17 is a flowchart for explaining an operation example of the image processing device relating to a radar image display process according to the present invention.

An operational example of the image processing device relating to the display process for the radar image according to the present invention is explained along the flowchart in FIG. 17. The shape of the visual field area of the radar image can be changed according to the screen ratio of the display unit independently from the change in the shape of the main screen as mentioned above or according to the shape of the main screen set independently from the screen ratio of the display unit. A case where the shape of the visual field area of the radar image is changed according to both the screen ratio of the display device and the shape of the game screen is explained as an example.

The image processing device (in this example, the game machine) reads the camera work control data (current contents of the various parameters relating to the camera work of the virtual camera) from the work memory 181, and displays a virtual three-dimensional image (main screen) on the display unit 30 according to a current camera angle of the virtual camera for the game main screen. At this time, the shape of the main screen is changed to be displayed according to the shape of the display unit, or the game proceeding, or both of them (step S1). The player views the video picture of the main screen displayed on the display unit 4 and simultaneously moves the player character or changes the visual field direction of the player character by means of the input unit 20. Since the game controller 110 changes the position of the first virtual camera, the camera angle and the like according to the movement of the player character, it obtains the position and the direction of the character in the three-dimensional space after operation based on the operation information from the input unit 20 and the position/direction data of the current character, so as to update contents of the parameters relating to the camera work (step S2).

A determination is made whether the radar image is displayed according to the game proceeding state and the player's display instruction (step S3). When the radar image is not displayed, the main screen data composed of the background, the player character and the like are read from the data memory 182 (step S4). The main screen display controller 130 executes the three-dimensional coordinate converting process at that camera angle (step S5), and outputs the virtual three-dimensional image of the main screen which is subject to the drawing process or the like to display it on the display unit 30. The sequence goes to step S1, and the above processes are repeated (step S6).

On the other hand, when the determination is made at step S3 that the radar image is displayed, the field angle of the second virtual camera is adjusted according to the screen ratio of the display device, and the shape of the visual field area is changed in the visual field according to the shape of the game screen. The changing process for the shape of the visual field area according to the screen ratio is executed according to a mode which is set according to each screen ratio (in this example, the standard mode and the wide-screen television mode). In this embodiment, as mentioned above, the visual field display in the vertical direction (or horizontal direction) is calculated based on the vertical field angle (or horizontal field angle) of the second virtual camera, for example, and the visual field display in the horizontal direction (or vertical direction) is calculated based on the above visual field display and the aspect ratio of the screen. Any directions of the visual field display may be increased or decreased based on any field angles, but in the case of the wide-screen television mode, it is preferable that the image in the visual field whose horizontal width is wider than that in the standard mode is displayed as the radar image. Further, a volume of the visual field area or a ratio of the area of the display area may be converted according to the aspect ratio of the screen. In this flow, the visual field area is changed at this time for convenience, but the visual field area is automatically changed according to the switching of modes by setting by means of the player's selecting operation, or by a signal input from the display device. It is not necessary to change the visual field area very time, but the visual field area can be changed at the time when an operation signal or the like is input so that the mode can be switched even during the game (step S7).

The predetermined range where the virtual three-dimensional space is captured from the second visual point position and the visual field area whose shape is changed (the visual field area where the area in which the virtual three-dimensional space is captured from the first or third visual point position at the changed field angle is projected to the predetermined range) are set as the radar image (step 8). For example, the reduced diagram of a three-dimensional map in the predetermined range is displayed, and the radar image such that the icons or the like, which represent the player character and the objects included in the predetermined range, are arranged in the visual field are is created (step S9). The main screen and the radar image are superposed or synthesized as separate windows to be output, or the radar image is output to another display device so as to be displayed on the display unit (step S10). The sequence goes to step S1, and the above processes are repeated.

The above-mentioned embodiment explains the computer games which adopt a mobile object (moving image) which moves according to a player's operation or control by a computer (shooting games and simulation games in which a radar is displayed, racing games in which a course map whose moving area is limited is displayed, sports games in which a map of a sports stadium is displayed, role-playing games and adventure games such as Dungeon in which a moving map is displayed) as examples. The present invention, however, is not limited to them, and it can be applied to any games in which a radar image is displayed. Further, in a "navigation device" or the like which displays a moving condition or the like of an actual mobile object or the like using a detector for a three-dimensional coordinate position in actual space, the present invention can be applied also to devices which display that situation which is replaced by a virtual three-dimensional space.

EFFECTS OF THE INVENTION

According to the present invention, since the shape of the visual field area of the radar image is changed according to the shape of the game screen on which the visual field in the virtual three-dimensional space is projected, the range which is actually in the visual field can be matched with the visual field display of the radar. Further, the function for changing the shape of the main screen according to the screen ratio of the display unit to change the shape of the visual field area accordingly, or a function for changing the shape of the visual field area according to the screen ratio of the display unit independently from the change in the shape of the main screen are provided. For this reason, even if the main screen is output to the display device with different screen ratio, the position relationship between the object in the virtual three-dimensional space and another object, the reduced diagram of the map and the like can be displayed accurately. Further, since the position relationship of the object is shown on the three-dimensional map by using the visual field areas where the virtual three-dimensional space is captured from two different visual points, the position relationship on the periphery or the whole of the objects on the map can be expressed easily understandably in the three-dimensional space.

INDUSTRIAL APPLICABILITY

The present invention can be applied to the information processing device which displays an image representing an arrangement relationship of a specified object on a map composing a virtual three-dimensional space as a radar image. Particularly, the present invention can be applied effectively to computer games such as action games and role playing games in which a mobile object moves in a virtual three-dimensional space in response to an operation by a player. Further, in the case where a virtual space is captured as an actual space and three-dimensional position information in the actual space is input to be processed, the present invention can be applied to various devices which display an image for navigation as well as the devices which process the game image.

<List of Reference Documents>
Patent Document 1: Japanese Patent Application Laid-Open No. 6-91054
Non-Patent Document 1: "Mobile Suit Gundam F91 Formula War 0122 Official Guide Book", Bandai Co., Ltd., Jul. 31, 1991, pp. 10-13 and 78-79

The invention claimed is:

1. A computer-readable recording medium having a game image display control program recorded thereon, the game image display control program causing a game apparatus to execute a method comprising:
displaying, using the game apparatus, a video picture captured from a first visual point position in a virtual three-dimensional space as a main screen of a game on a display unit;
displaying, using the game apparatus, a predetermined range where the virtual three-dimensional space is captured from a second visual point position and a visual field area, in which an area where the virtual three-dimensional space is captured from the first or a third visual point position at a predetermined azimuthal angle is projected in the predetermined range, as a radar image representing a position relationship of an object on a three-dimensional map including the virtual three-dimensional space; and
changing, using the game apparatus, a shape of the visual field area according to a shape of the main screen in the display unit.

2. The computer-readable recording medium according to claim 1, wherein the method further comprises changing the shape of the main screen according to a screen ratio of the display unit to change the shape of the visual field area accordingly.

3. The computer-readable recording medium according to claim 1, wherein the method further comprises changing the shape of the visual field area according to a screen ratio of the display unit independently from a change in the shape of the main screen.

4. The computer-readable recording medium according to claim 1, wherein the method further comprises setting the shape of the main screen independently from a screen ratio of the display unit and changing the shape of the visual field area according to the set shape of the main screen.

5. The computer-readable recording medium according to claim 1, wherein the method further comprises changing the shape of the main screen according to a game proceeding.

6. The computer-readable recording medium according to claim 1, wherein the visual field area is a pyramid shaped or a conical visual field area where the first or the third visual point position is an apex.

7. The computer-readable recording medium according to claim 1, wherein the visual field area is a quadrangular pyramid shaped or a conical visual field area where the first or the third visual point position is an apex, and wherein the method further comprises changing the shape of the main screen and the shape of the visual field area so that an aspect ratio of a bottom surface of the quadrangular pyramid matches with a screen ratio of the display unit.

8. The computer-readable recording medium according to claim 1, wherein the method further comprises using a virtual camera, which photographs an area captured from the first or the third visual point position, to adjust a field angle of the virtual camera according to the shape of the main screen so as to change the shape of the visual field area.

9. The computer-readable recording medium according to claim 1, wherein the method further comprises using one of a mode where a ratio of a horizontal direction to a vertical direction of the screen of the display unit is 4:3 and a mode where the ratio is 16:9 for widening a visual field in the horizontal direction of the visual field area in comparison with the mode where the ratio of the horizontal direction to the vertical direction is 4:3.

10. The computer-readable recording medium according to claim 1, wherein the video picture to be displayed on the main screen is a video picture relating to a mobile object moving in the virtual three-dimensional space in response to a player's operation and a visual field direction of the video picture on the main screen can be freely rotationally moved to any direction in the virtual three-dimensional space with the first visual point position being a center independently from an advancing direction of the mobile object, and wherein the method further comprises controlling a rotation movement of the visual field area in conjunction with the rotational movement of the video picture on the main screen.

11. The computer-readable recording medium according to claim 1, wherein the video picture to be displayed on the main screen is a video picture relating to a mobile object moving in the virtual three-dimensional space in response to a player's operation, and wherein an entire movable area of the mobile object or a periphery of the mobile object is displayed as the radar image.

12. The computer-readable recording medium according to claim 1, wherein the video picture to be displayed on the main screen is a video picture relating to a mobile object moving in the virtual three-dimensional space in response to a player's operation, and wherein the third visual point position is a position of the mobile object or a position in a vicinity of the mobile object.

13. The computer-readable recording medium according to claim 1, wherein the video picture to be displayed on the main screen is a video picture relating to a mobile object moving in the virtual three-dimensional space in response to a player's operation, and wherein the second visual point position is a position above the mobile object.

14. The computer-readable recording medium according to claim 1, wherein the video picture to be displayed on the main screen is a video picture relating to a mobile object moving in the virtual three-dimensional space in response to a player's operation, and wherein a predetermined range where the virtual three-dimensional space is captured from the second visual point position is a range centering on the mobile object.

15. A computer-readable recording medium having a game image display control program recorded thereon, the game image display control program causing a game apparatus to execute a method comprising:
   displaying, using the game apparatus, a video picture obtained by capturing a mobile object moving in a virtual three-dimensional space from a first visual point position as a main screen of a game on a display unit;
   capturing, using the game apparatus, a predetermined range centering on the mobile object in the virtual three-dimensional space and a predetermined object included in the predetermined range from a position above the mobile object;
   displaying, using the game apparatus, the predetermined range and icons representing the mobile object and the predetermined object as a radar image on a part of the main screen of the game;
   displaying, using the game apparatus, a visual field area, where an area in which the virtual three-dimensional space is captured from the first visual point position or from the position of the mobile object is projected in the predetermined range, on a radar screen;
   for changing, using the game apparatus a shape of the main screen according to a shape of the display unit or a game proceeding; and
   changing, using the game apparatus, a shape of the visual field area according to the shape of the main screen.

16. A game machine capable of executing a game image control program for displaying, using the game machine, a video picture captured from a first visual point position in a virtual three-dimensional space as a main screen of a game on a display unit, and displaying, using the game machine, a predetermined range where the virtual three-dimensional space is captured from a second visual point position and a visual field area, in which an area where the virtual three-dimensional space is captured from the first or a third visual point position at a predetermined azimuthal angle is projected in the predetermined range, as a radar image representing a position relationship of an object on a three-dimensional map including the virtual three-dimensional space, the game machine comprising
   means for changing a shape of the visual field area according to a shape of the main screen in the display unit.

* * * * *